US012681671B2

(12) United States Patent (10) Patent No.: US 12,681,671 B2
Izawa et al. (45) Date of Patent: Jul. 14, 2026

(54) PRINT DATA GENERATION DEVICE AND PRINT DATA GENERATION METHOD

(71) Applicant: SCREEN Holdings Co., Ltd., Kyoto (JP)

(72) Inventors: Yo Izawa, Kyoto (JP); Kenta Nagai, Kyoto (JP); Hiroshi Nishide, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 226 days.

(21) Appl. No.: 18/761,472

(22) Filed: Jul. 2, 2024

(65) Prior Publication Data

US 2025/0013406 A1 Jan. 9, 2025

(30) Foreign Application Priority Data

Jul. 6, 2023 (JP) ................................. 2023-111237

(51) Int. Cl.
G06F 3/12 (2006.01)
(52) U.S. Cl.
CPC ............ G06F 3/125 (2013.01); G06F 3/1208 (2013.01)
(58) Field of Classification Search
CPC ...... G06F 3/125; G06F 3/1208; G06F 3/1207; G06F 3/1206; G06F 3/1211; G06F 3/1275; G06F 3/1205
See application file for complete search history.

(56) References Cited

U.S. PATENT DOCUMENTS

| 2018/0004471 A1* | 1/2018 | Suzuki ................... | G06F 3/121 |
| 2020/0070495 A1* | 3/2020 | Iko ........................ | B41F 19/008 |
| 2020/0334506 A1* | 10/2020 | Zamir .................. | G06K 15/027 |
| 2023/0297304 A1* | 9/2023 | Hashimoto ........... | G06F 3/1222 |
| | | | 358/1.13 |
| 2023/0322002 A1* | 10/2023 | De Marco .............. | B26D 1/626 |
| | | | 347/16 |
| 2023/0406654 A1* | 12/2023 | Shimokawa ............. | B65H 7/02 |

FOREIGN PATENT DOCUMENTS

JP 2021-157383 A 10/2021

* cited by examiner

*Primary Examiner* — Iriana Cruz
(74) *Attorney, Agent, or Firm* — Rimon P.C.

(57) ABSTRACT

In a print data generation device, accessory preset data including accessory configuration information necessary for printing an accessory image is held in advance in an accessory preset data holding unit. A list of preset names each identifying accessory configuration information associated with a processing type selected by an operator is presented, and an accessory preset selection unit accepts the selection of a preset name. An accessory-included imposition data generation unit generates accessory-included imposition data by adding an accessory image corresponding to the selected preset name to imposition data.

14 Claims, 29 Drawing Sheets

PRINT AREA OF
ACTUAL IMAGE

51

51

53

54

51

51

51

55

START

S10   CREATE ACCESSORY PRESET DATA

S20   INTRODUCE ACCESSORY PRESET DATA INTO PRINT DATA GENERATION DEVICE

S30   PRINT DATA GENERATION PROCESS

S40   PRINTING

S50   POST-PROCESSING

END

Fig.7

| PRESET NAME | PROCESSING TYPE | MANUFACTURER | MODEL | UPDATE DATE/TIME | ACCESSORY CONFIGURATION INFORMATION |
|---|---|---|---|---|---|

Fig.8

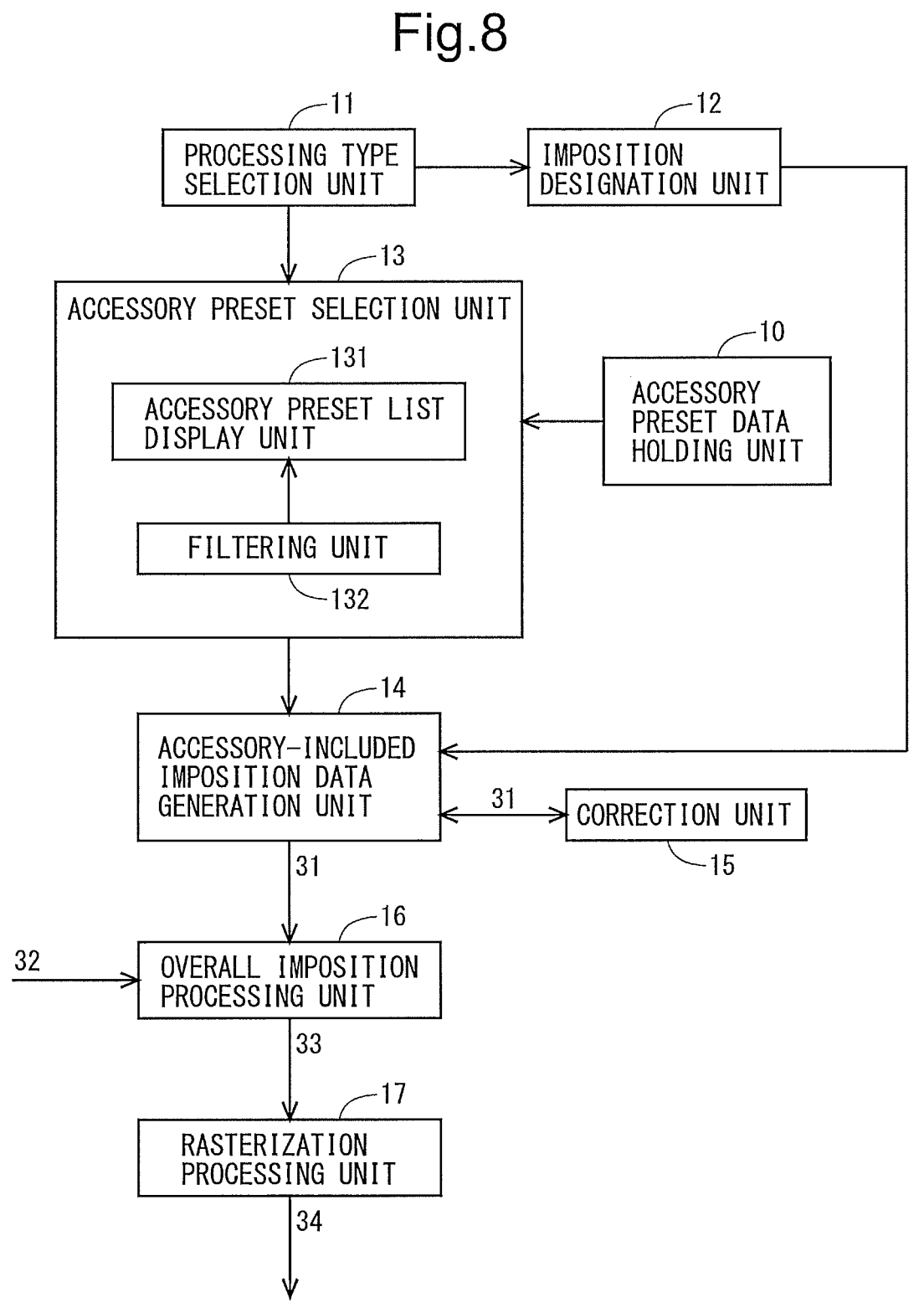

```
            ┌─11                              ┌─12
  ┌──────────────────────┐    ┌──────────────────────┐
  │  PROCESSING TYPE     │───▶│  IMPOSITION          │
  │  SELECTION UNIT      │    │  DESIGNATION UNIT    │
  └──────────────────────┘    └──────────────────────┘
            │
            │            ┌─13
            ▼
  ┌───────────────────────────────────────────┐
  │ ACCESSORY PRESET SELECTION UNIT            │
  │              ┌─131                         │          ┌─10
  │   ┌───────────────────────────┐           │  ┌──────────────────┐
  │   │  ACCESSORY PRESET LIST    │◀──────────┼──│  ACCESSORY       │
  │   │  DISPLAY UNIT             │           │  │  PRESET DATA     │
  │   └───────────────────────────┘           │  │  HOLDING UNIT    │
  │                 ▲                          │  └──────────────────┘
  │   ┌───────────────────────────┐           │
  │   │     FILTERING UNIT        │           │
  │   └───────────────────────────┘           │
  │              └─132                         │
  └───────────────────────────────────────────┘
            │
            │            ┌─14
            ▼
  ┌──────────────────────┐
  │  ACCESSORY-INCLUDED  │◀─────────────────────────────────┐
  │  IMPOSITION DATA     │        31     ┌──────────────────┐
  │  GENERATION UNIT     │◀────────────▶│  CORRECTION UNIT │
  └──────────────────────┘              └──────────────────┘
            │ 31                               └─15
            │            ┌─16
            ▼
  ┌──────────────────────┐
32─▶│  OVERALL IMPOSITION  │
  │  PROCESSING UNIT     │
  └──────────────────────┘
            │ 33
            │            ┌─17
            ▼
  ┌──────────────────────┐
  │  RASTERIZATION       │
  │  PROCESSING UNIT     │
  └──────────────────────┘
            │ 34
            ▼
```

PRINT DATA GENERATION PROCESS

S300    SELECT PROCESSING TYPE

S310    DESIGNATE IMPOSITION MODE

S320    FILTER AS NECESSARY

S330    DISPLAY PRESET NAME LIST

S340    SELECT PRESET NAME

S350    GENERATE ACCESSORY-INCLUDED IMPOSITION DATA

S360    IS ADJUSTMENT NECESSARY?    No    Yes

S370    ADJUSTMENT WORK

S380    IMPOSE ALL PAGES

S390    RASTERIZATION PROCESS

END

Fig.10

| PRESET NAME | PROCESSING TYPE | MANUFACTURER | MODEL |
|---|---|---|---|
| RegisterMark-01 | NOT DESIGNATED | NOT DESIGNATED | NOT DESIGNATED |
| Binding-KY001 | SADDLE STITCHING | XYZ | KY |
| Binding-KY002 | SADDLE STITCHING | XYZ | KY |
| Binding-KY003 | SADDLE STITCHING | XYZ | KY |
| Binding-012789 | CROSS FOLDING | XYZ | WZHH-S |
| SheetCut-XYZ | CROSS FOLDING | XYZ | CUT-55 |
| CrossFold-JP135 | CROSS FOLDING | JAPAZ | JP-135 |
| CrossFold-ZLMN | CROSS FOLDING | ZLMN | Z-S1 |
| SaddldFold-XYZ | SADDLE STITCHING | XYZ | FOLD-002 |
| SaddldFold-25 | SADDLE STITCHING | SCBA | SC-NEW |
| SheetCut-AZY | CUT & STACK | AZY | A-10 |
| SheetCut-ABC01 | CROSS FOLDING | ABC | DH437 |
| SheetCut-ABC02 | CROSS FOLDING | ABC | PQK |
| PlowFold-X333 | PLOW FOLDING | XYZ | PLOW-9 |
| Cut-PresetX | SADDLE STITCHING | JAPAZ | JP-321 |

| |
|---|
| Binding-KY001 |
| Binding-KY002 |
| Binding-KY003 |
| SaddldFold-XYZ |
| SaddldFold-25 |
| Cut-PresetX |

| |
|---|
| Binding-012789 |
| SheetCut-XYZ |
| CrossFold-JP135 |
| CrossFold-ZLMN |
| SheetCut-ABC01 |
| SheetCut-ABC02 |

Binding-KY001
Binding-KY002
Binding-KY003
SaddldFold-XYZ

Binding-KY001
Binding-KY002
Binding-KY003

PRINT AREA OF ACTUAL IMAGE

56

PRINT AREA OF ACTUAL IMAGE

PRINT AREA OF ACTUAL IMAGE

58

PRINT AREA OF ACTUAL IMAGE

PRINT AREA OF ACTUAL IMAGE

Figure 33:
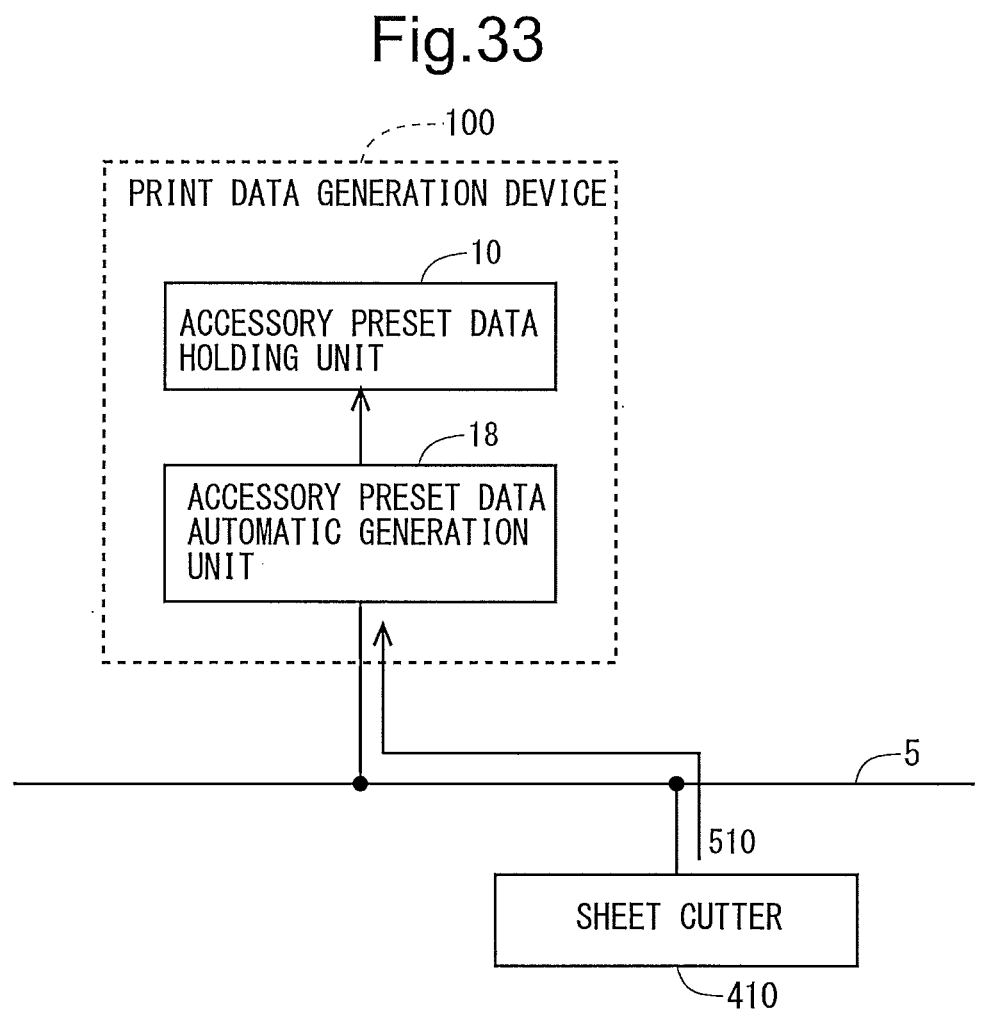

PRINT DATA GENERATION DEVICE

10

ACCESSORY PRESET DATA
HOLDING UNIT

18

ACCESSORY PRESET DATA
AUTOMATIC GENERATION
UNIT

5

510

SHEET CUTTER

Figure 34:
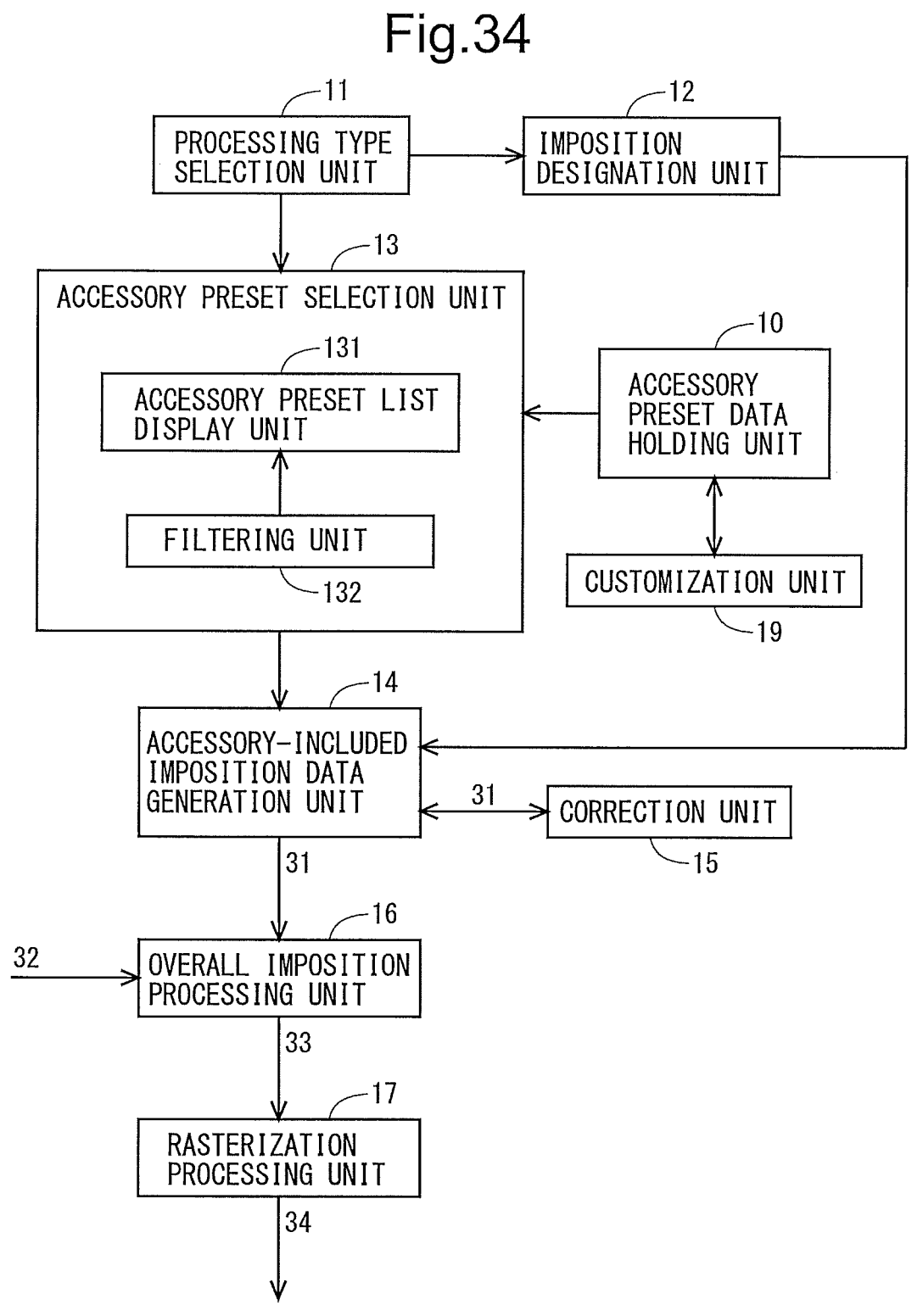

```
           ┌─11                              ┌─12
    ┌──────────────────┐          ┌──────────────────┐
    │ PROCESSING TYPE  │─────────→│ IMPOSITION       │
    │ SELECTION UNIT   │          │ DESIGNATION UNIT │
    └──────────────────┘          └──────────────────┘
             │                              │
             │        ┌─13                  │
             ↓                              │
┌──────────────────────────────────────┐   │
│ ACCESSORY PRESET SELECTION UNIT       │   │
│               ┌─131                   │   │     ┌─10
│   ┌──────────────────────────┐        │   │  ┌──────────────┐
│   │ ACCESSORY PRESET LIST    │←───────┼───┼──│ ACCESSORY    │
│   │ DISPLAY UNIT             │        │   │  │ PRESET DATA  │
│   └──────────────────────────┘        │   │  │ HOLDING UNIT │
│               ↑                       │   │  └──────────────┘
│   ┌──────────────────────────┐        │   │       ↕
│   │ FILTERING UNIT           │        │   │  ┌──────────────┐
│   └──────────────────────────┘        │   │  │ CUSTOMIZATION│
│               └─132                   │   │  │ UNIT         │
└──────────────────────────────────────┘   │  └──────────────┘
             │                              │    └─19
             │        ┌─14                  │
             ↓                              │
┌──────────────────────────┐  31  ┌──────────────────┐
│ ACCESSORY-INCLUDED       │←─────→│ CORRECTION UNIT  │
│ IMPOSITION DATA          │      └──────────────────┘
│ GENERATION UNIT          │           └─15
└──────────────────────────┘
             │ 31
             │        ┌─16
             ↓
   ┌──────────────────────────┐
32─→│ OVERALL IMPOSITION       │
   │ PROCESSING UNIT          │
   └──────────────────────────┘
             │ 33
             │        ┌─17
             ↓
   ┌──────────────────────────┐
   │ RASTERIZATION            │
   │ PROCESSING UNIT          │
   └──────────────────────────┘
             │ 34
             ↓
```

PRINT DATA GENERATION DEVICE AND PRINT DATA GENERATION METHOD

BACKGROUND OF THE INVENTION

Field of the Invention

The present invention relates to a print data generation device, a print data generation method, and a print data generation program for generating print data for a printing apparatus to perform printing on printing paper, and more particularly to a technique for generating print data including data of an accessory image to be placed outside a print area of an actual image for post-processing that is performed after printing.

Description of Related Art

In a bookbinding printing system, before execution of printing in a printing apparatus, designing work for imposition and flatplan (hereinafter referred to as "flatplan editing work") is performed. After the execution of printing in the printing apparatus, processes called "post-processing" are performed to produce a final product, such as a book, from printed printing paper. As post-processing machines that perform post-processing, the following are known: a sheet cutter (cutting machine) that cuts printed printing paper, which is continuous paper, into a specified size; a folding machine that creates a signature from the printed printing paper cut into the specified size; a gathering machine that gathers a plurality of signatures; a binding machine that performs binding processing on a group of signatures in a gathered state; a three-way cutting machine that performs finish cutting in three directions (head, tail, fore edge) of a book, and the like.

In the bookbinding printing system as described above, an additional image (hereinafter referred to as an "accessory image") called an accessory such as an alignment mark or a barcode for transmitting processing information (e.g., thickness of printing paper and distinction between cover and body) to the post-processing machine is printed outside a print area of an actual image (an image based on submitted data) at the time of printing by the printing apparatus so that the post-processing machines appropriately perform post-processing on the printed printing paper. To achieve this, during the flatplan editing work, an operator performs accessory design work including determining an accessory image to be printed on printing paper, setting the position of the accessory image, and others.

In connection with the present invention, Japanese Laid-Open Patent Publication No. 2021-157383 discloses an invention of an imposition device that inspects whether processing data conforms to specifications of a post-processing machine on the basis of printing conditions and imposition information created by an operator.

Meanwhile, there are various types of bookbinding, and the content of post-processing to be performed on printed printing paper is different for each type. That is, for post-processing, there are various types (processing types: bookbinding processing types). In addition, various post-processing machines are provided by many manufacturers, and specifications are different for each post-processing machine. The accessory design work needs to be performed considering the processing type and the specification of the post-processing machine. However, since there are various processing types and various post-processing machines are provided as described above, according to the software for flatplan editing work provided conventionally, it is necessary for the operator to determine an accessory image and set the position of the accessory image one by one while referring to the manual with an enormous number of pages. Therefore, the operation is extremely complex and requires a great deal of effort for the operator. Further, it is necessary to repeat flatplan editing work and trial processing by the post-processing machine until determination of an accessory image and setting of the position of the accessory image are correctly performed. From the above, a wealth of experience is required to appropriately and promptly perform flatplan editing work including accessory design work.

In addition, although it is necessary to set an accessory image to be added to printing paper and the position of the accessory image depending on the processing type (bookbinding processing type) in the flatplan editing work, there is no mention of this in Japanese Laid-Open Patent Publication No. 2021-157383.

SUMMARY OF THE INVENTION

In view of the circumstances as above, an object of the present invention is to provide a print data generation device capable of appropriately and promptly performing flatplan editing work including accessory design work regardless of the degree of skill in the work.

One aspect of the present invention is directed to a print data generation device that generates print data for a printing apparatus to perform printing on printing paper, the print data generation device including:

an accessory data holding unit configured to hold accessory data in which accessory configuration information is associated with an accessory identifier for identifying the accessory configuration information and a processing type indicating a mode of a series of processing processes to be performed after a printing process by the printing apparatus, the accessory configuration information being information necessary for printing an accessory image to be placed outside a print area of an actual image based on submitted data on printing paper;

a processing type selection unit configured to present a plurality of processing types and accept selection of a processing type by an operator;

an imposition designation unit configured to accept designation of an imposition mode by the operator, the imposition mode representing arrangement of one or more pages on printing paper;

an accessory selection unit including an accessory list display unit configured to present selectable accessory identifiers, the accessory selection unit being configured to present, on the accessory list display unit, one or more accessory identifiers identifying one or more pieces of accessory configuration information associated with the processing type accepted by the processing type selection unit with reference to the accessory data held in the accessory data holding unit, and accept selection of an accessory identifier by the operator;

an accessory-included imposition data generation unit configured to generate accessory-included imposition data by adding an accessory image based on accessory configuration information identified by the accessory identifier accepted by the accessory selection unit to imposition data indicating the imposition mode accepted by the imposition designation unit; and an overall imposition processing unit configured to generate the print data by imposing all pages included in the submitted data on a basis of the accessory-included imposition data.

With such a configuration, the print data generation device holds accessory data in which accessory configuration information as information necessary for printing an accessory image is associated with an accessory identifier for identifying the accessory configuration information and a processing type indicating a mode of post-processing (a series of processing to be performed after a printing process). When the operator selects a processing type, a list of accessory identifiers each associated with the selected processing type is presented in the accessory list display unit. When the operator selects one or more accessory identifiers, the accessory-included imposition data is generated by adding one or more accessory images identified by the one or more accessory identifiers selected to imposition data indicating the imposition mode designated by the operator. That is, when the accessory identifier is appropriately selected, desired accessory-included imposition data is generated considering specifications of one or more post-processing machines (processing devices) used for post-processing. From the above, it is possible to implement the print data generation device capable of appropriately and promptly performing flatplan editing work including accessory design work regardless of the degree of skill in the work. Further, since the accessory image is prevented from being placed at an inappropriate position on the printing paper, the need for reprinting is reduced compared to the past, which can lead to decreased consumption of printing paper and ink. In this way, it is possible to contribute to the achievement of the sustainable development goals (SDGs).

Another aspect of the present invention is directed to a print data generation device that generates print data for a printing apparatus to perform printing on printing paper, the print data generation device including:

a display device;

a storage device configured to hold accessory data in which accessory configuration information is associated with an accessory identifier for identifying the accessory configuration information and a processing type indicating a mode of a series of processing processes to be performed after a printing process by the printing apparatus, the accessory configuration information being information necessary for printing an accessory image to be placed outside a print area of an actual image based on submitted data on printing paper; and a processor;

wherein the processor presents a plurality of processing types on the display device and accepts selection of a processing type by an operator;

the processor accepts designation of an imposition mode by the operator, the imposition mode representing arrangement of one or more pages on printing paper;

the processor presents, on the display device, one or more accessory identifiers that identify one or more pieces of accessory configuration information associated with the processing type accepted with reference to the accessory data held in the storage device, and accepts selection of an accessory identifier by the operator, the processor generates accessory-included imposition data by adding an accessory image based on accessory configuration information identified by the accessory identifier accepted to imposition data indicating the imposition mode accepted, and the processor generates the print data by imposing all pages included in the submitted data on a basis of the accessory-included imposition data.

Still another aspect of the present invention is directed to a print data generation method for generating, by a print data generation device, print data for a printing apparatus to perform printing on printing paper, the print data generation device including a display unit, and an accessory data holding unit configured to hold accessory data in which accessory configuration information is associated with an accessory identifier for identifying the accessory configuration information and a processing type indicating a mode of a series of processing processes to be performed after a printing process by the printing apparatus, the accessory configuration information being information necessary for printing an accessory image to be placed outside a print area of an actual image based on submitted data on printing paper, the print data generation method including:

a processing type selection step of presenting a plurality of processing types and accepting selection of a processing type by an operator;

an imposition designation step of accepting designation of an imposition mode by the operator, the imposition mode representing arrangement of one or more pages on printing paper;

an accessory selection step of presenting one or more accessory identifiers identifying one or more pieces of accessory configuration information associated with the processing type accepted in the processing type selecting step on the display unit with reference to the accessory data held in the accessory data holding unit, and accepting selection of an accessory identifier by the operator;

an accessory-included imposition data generation step of generating accessory-included imposition data by adding an accessory image based on accessory configuration information identified by the accessory identifier accepted in the accessory selection step to imposition data indicating the imposition mode accepted in the imposition designation step; and an overall imposition processing step of generating the print data by imposing all pages included in the submitted data on a basis of the accessory-included imposition data.

These and other objects, features, modes, and advantageous effects of the present invention will become more apparent from the following detailed description of the present invention with reference to the accompanying drawings.

BRIEF DESCRIPTION OF THE DRAWINGS

FIG. 4 is a block diagram m showing a hardware configuration of a print data generation device in the embodiment;

FIG. 5 is a diagram for describing an accessory image in the embodiment;

FIG. 7 is a diagram showing an example of a data structure of accessory preset data in the embodiment;

FIG. 8 is a block diagram showing a functional configuration implemented by executing a print data generation program in the embodiment;

FIG. 10 is a diagram showing an example of a plurality of pieces of accessory preset data held in an accessory preset data holding unit in the embodiment;

FIG. 18 is a diagram showing an example of presentation of a list of preset names in a dropdown list in the accessory preset selection screen when no setting is made to perform filtering in the embodiment;

FIG. 19 is a diagram for describing preset name filtering in the embodiment;

FIG. 20 is a diagram for describing preset name filtering in the embodiment;

FIG. 21 is a diagram for describing preset name filtering in the embodiment;

FIG. 25 is a diagram for describing generation of accessory-included imposition data in the embodiment;

FIG. 28 is a diagram for describing the need to adjust a position and the like of an accessory images in the embodiment;

FIG. 31 is a diagram showing an example of an accessory preset selection screen in a first modification of the embodiment;

FIG. 32 is a diagram showing an example of the accessory preset selection screen after a text string for filtering has been inputted in the first modification;

FIG. 33 is a block diagram for describing a configuration related to automatic generation of accessory preset data in a second modification of the embodiment;

FIG. 34 is a block diagram showing a functional configuration implemented by executing a print data generation program in a third modification of the embodiment;

DETAILED DESCRIPTION OF PREFERRED EMBODIMENTS

An embodiment of the present invention will be described with reference to the accompanying drawings.

1. Overall Configuration

Figure 1:
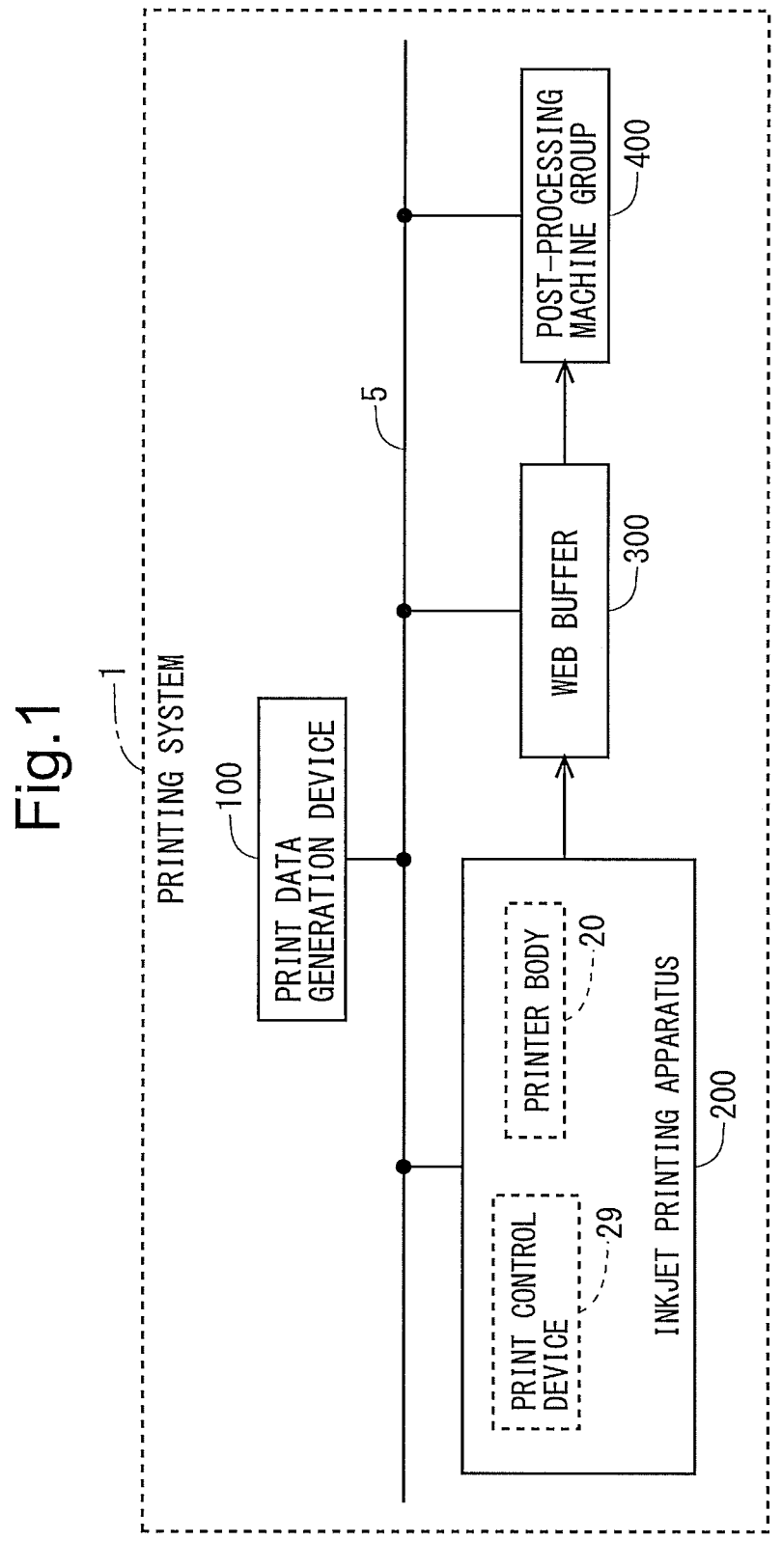
FIG. 1 is a block diagram showing an overall configuration of a printing system according to an embodiment of the present invention.

FIG. 1 is a block diagram showing an overall configuration of a printing system 1 according to an embodiment of the present invention. The printing system 1 includes a print data generation device 100, an inkjet printing apparatus 200, a web buffer 300, and a post-processing machine group 400. The print data generation device 100, the inkjet printing apparatus 200, the web buffer 300, and the post-processing machine group 400 are communicably connected through a network 5 such as a local-area network (LAN).

The print data generation device 100 generates print data by performing a rasterization process or the like on submitted data, such as a portable document format (PDF) file. In this regard, the print data is generated considering a result of flatplan editing work performed by an operator. The print data generated by the print data generation device 100 is transmitted to the inkjet printing apparatus 200 via the network 5. The inkjet printing apparatus 200 includes a printer body 20, and a print control device 29 that controls the operation of the printer body 20. The inkjet printing apparatus 200 outputs a print image on printing paper as a printing medium on the basis of the print data transmitted from the print data generation device 100 without using a printing plate.

As shown in FIG. 1, the web buffer 300 is provided between the inkjet printing apparatus 200 and the post-processing machine group 400. The printed printing paper is supplied from the inkjet printing apparatus 200 to the post-processing machine group 400 via the web buffer 300. The web buffer 300 temporarily holds the printed printing paper as appropriate to absorb the difference in process speed between the inkjet printing apparatus 200 and the post-processing machine group 400.

Figure 2:
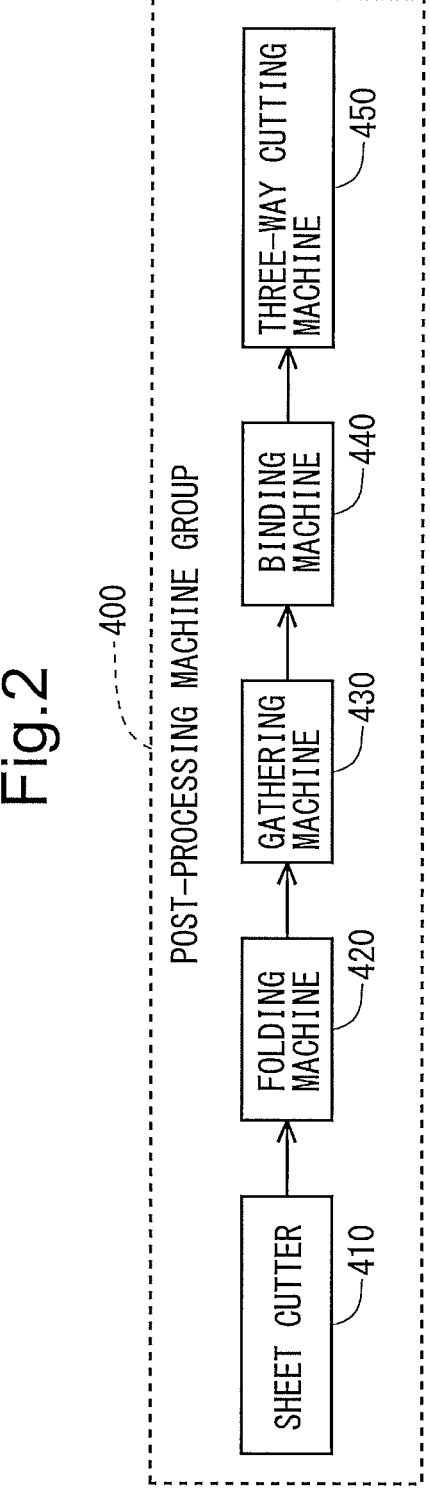
FIG. 2 is a block diagram showing a configuration example of a post-processing machine group in the embodiment.

The post-processing machine group >400 includes a plurality of devices (post-processing machines) for performing post-processing (post-processes) on the printed printing paper. As an example, as illustrated in FIG. 2, the post-processing machine group 400 includes a sheet cutter 410 that cuts continuous paper after printing by the inkjet printing apparatus 200 into a specified size, a folding machine 420 that creates a signature from the printing paper cut into the specified size, a gathering machine 430 that gathers a plurality of signatures, a binding machine 440 that performs binding processing on the group of signatures in a gathered state, and a three-way cutting machine 450 that performs finish cutting in three directions (head, tail, and fore edge) of a book.

As above, in the present embodiment, the configuration in which the printed printing paper is directly supplied from the inkjet printing apparatus 200 to the post-processing machine group 400 via the web buffer 300 (i.e., an in-line configuration) is adopted. However, the present invention is not limited thereto, and a configuration in which the post-processing machine group is not in line can also be adopted.

2. Configuration of Inkjet Printing Apparatus

Figure 3:
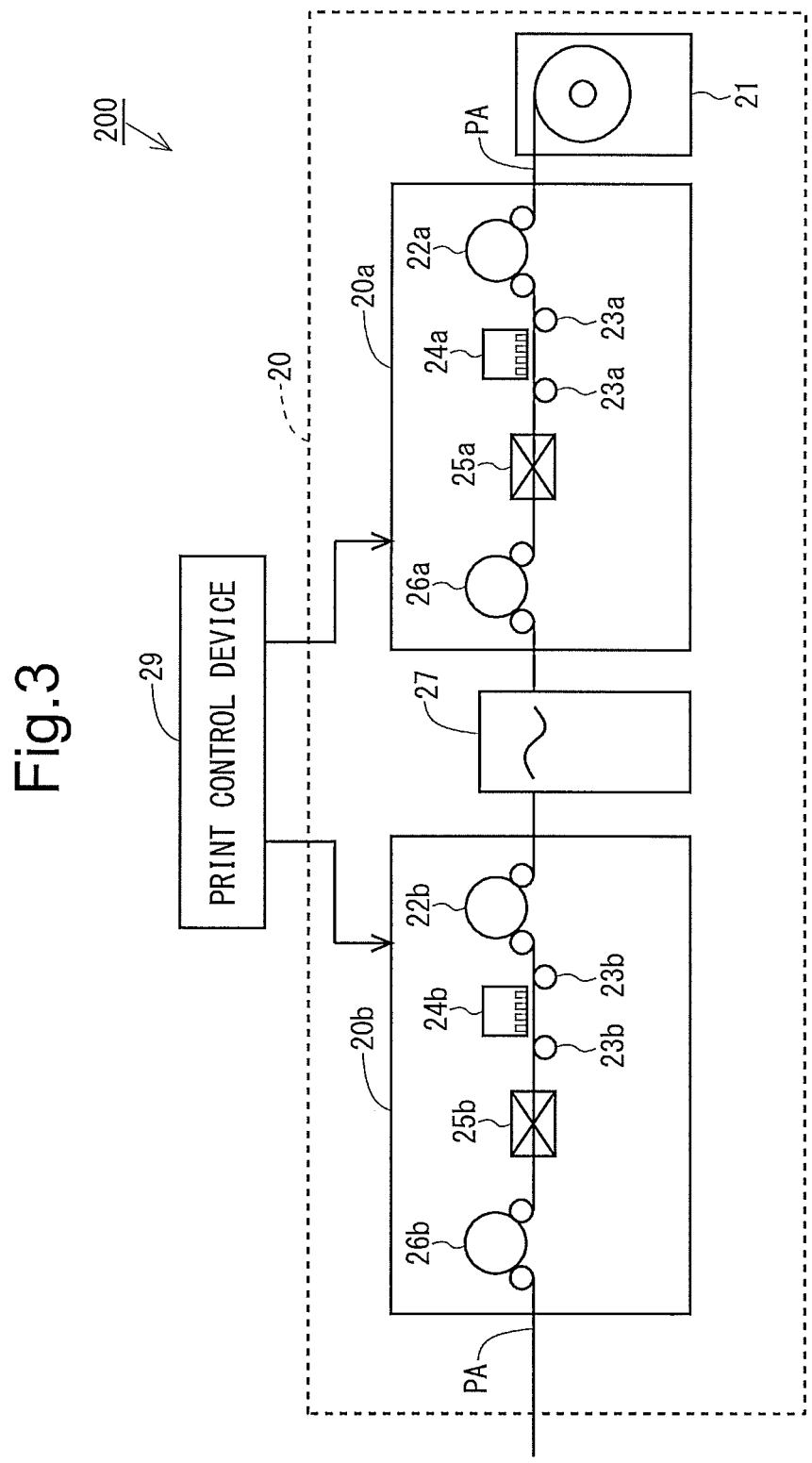
FIG. 3 is a schematic diagram showing a configuration example of an inkjet printing apparatus in the embodiment.

FIG. 3 is a schematic diagram showing a configuration example of the inkjet printing apparatus 200. As described above, the inkjet printing apparatus 200 includes the printer body 20 and the print control device 29 that is a controller of the printer body 20.

The printer body 20 is equipped with a paper feeding unit 21 that supplies printing paper (here, roll paper) PA, a first printing mechanism 20*a* that performs printing on the front surface of the printing paper PA, a reversing unit 27 that reverses the front surface and the back surface of the printing paper PA outputted from the first printing mechanism 20*a*, and a second printing mechanism 20*b* that performs printing on the back surface of the printing paper PA. The first printing mechanism 20*a* is equipped with a first driving roller 22*a* that conveys the printing paper PA to the inside, a plurality of support rollers 23*a* that conveys the printing paper PA inside the first printing mechanism 20*a*, a printing unit 24*a* that performs printing by ejecting ink onto the printing paper PA, a drying unit 25*a* that dries the printed printing paper PA, and a second driving roller 26*a* that outputs the printing paper PA from the inside of the first printing mechanism 20*a*. The printing unit 24*a* includes, for example, inkjet head rows of C color (cyan), M color (magenta), Y color (yellow), and K color (black) arranged in a row in the conveyance direction of the printing paper PA. Each inkjet head row includes a plurality of inkjet heads (print heads) arranged in a zigzag shape. Each inkjet head includes many nozzles for ejecting ink. The configuration of the second printing mechanism 20*b* is similar to the configuration of the first printing mechanism 20*a*, and hence the description thereof will be omitted. Note that "a" is added to the end of each of the reference numerals for the components of the first printing mechanism 20*a*, and "b" is added to the end of each of the reference numerals for the components of the second printing mechanism 20*b*.

The print control device 29 controls the operation of the printer body 20 having the configuration as above. When a printout instruction command is given to the print control device 29, the print control device 29 controls the operation of the printer body 20 so that the printing paper PA is conveyed from the paper feeding unit 21 to the inside. Then, in the first printing mechanism 20*a* and the second printing mechanism 20*b*, first, the printing units 24*a*, 24*b* perform printing on the printing paper PA, and next, the drying units 25*a*, 25*b* dry the printing paper PA.

Although the configuration of the inkjet printing apparatus 200 that performs color printing has been exemplified here, the present invention can also be applied to a case where an inkjet printing apparatus that performs monochrome printing is adopted. Further, although the configuration of the inkjet printing apparatus 200 using aqueous ink has been exemplified here, the present invention can also be applied to a case where an inkjet printing apparatus using ultraviolet (UV) ink (ultraviolet curing ink) such as an inkjet printing apparatus for label printing, for example. Moreover, although the configuration of the inkjet printing apparatus 200 including the first printing mechanism 20*a* for front-surface printing and the second printing mechanism 20*b* for back-surface printing has been exemplified here, the present invention can also be applied to a case where an inkjet printing apparatus not including the second printing mechanism 20*b* for back-surface printing is adopted.

3. Hardware Configuration of Print Data Generation Device

Figure 4:
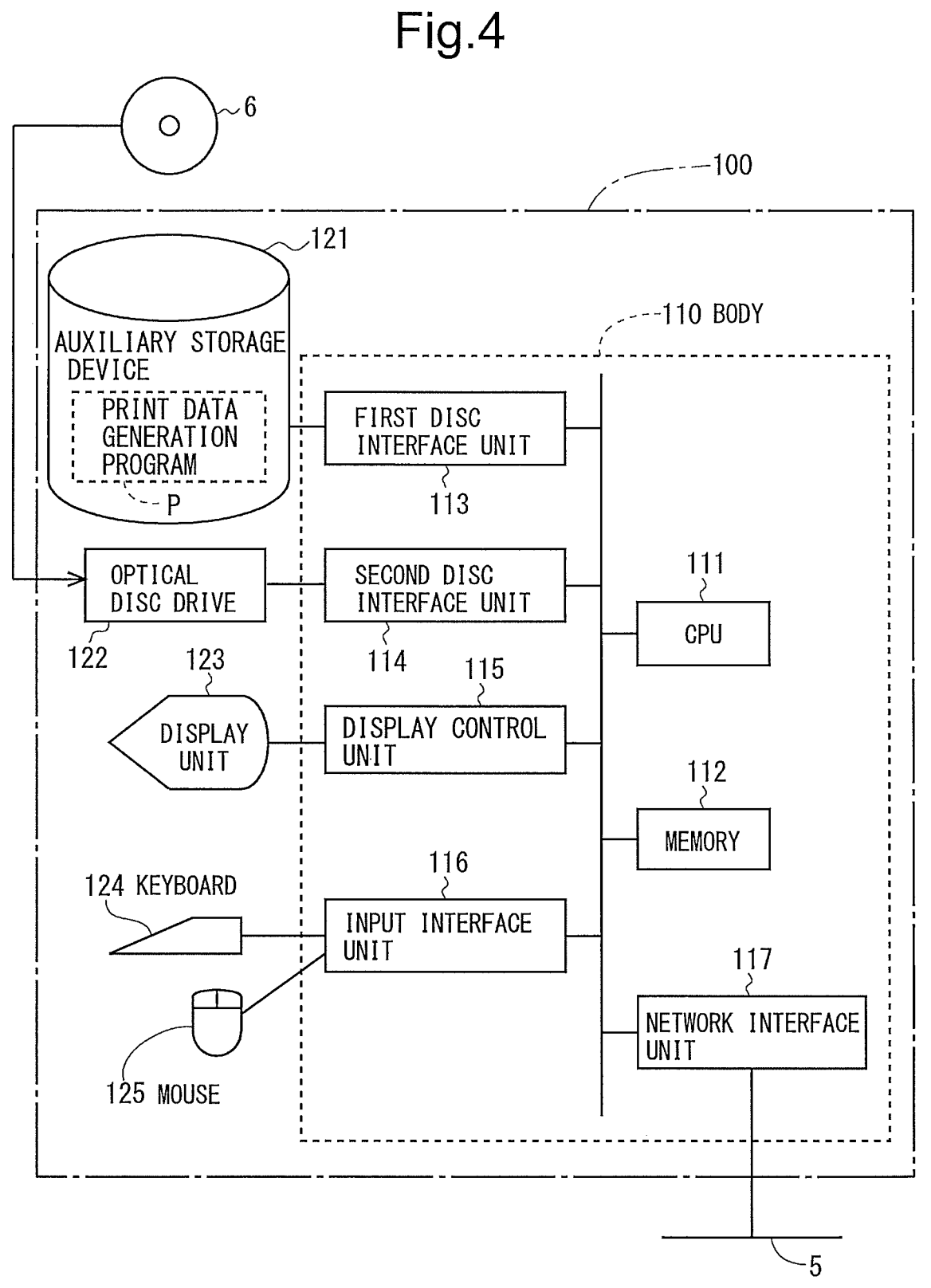

FIG. 4 is a block diagram showing a hardware configuration of the print data generation device 100. As illustrated in FIG. 4, the print data generation device 100 is equipped with a body 110, an auxiliary storage device 121, an optical disc drive 122, a display unit 123, a keyboard 124, a mouse 125, and the like. The body 110 includes a central processing unit (CPU) 111 as a processor, a memory 112, a first disc interface unit 113, a second disc interface unit 114, a display control unit 115, an input interface unit 116, and a network interface unit 117. The CPU 111, the memory 112, the first disc interface unit 113, the second disc interface unit 114, the display control unit 115, the input interface unit 116, and the network interface unit 117 are connected to each other via a system bus. The auxiliary storage device 121 is connected to the first disc interface unit 113. The optical disc drive 122 is connected to the second disc interface unit 114. The display unit (display device) 123 is connected to the display control unit 115.

The keyboard 124 and the mouse 125 are connected to the input interface unit 116. A network 5 is connected to the network interface unit 117. The auxiliary storage device 121 is a magnetic disc device or the like. An optical disc 6 as a computer-readable recording medium such as a compact disc read-only memory (CD-ROM) or a digital versatile disc (DVD)-ROM is inserted into the optical disc drive 122. The display unit 123 is a liquid crystal display or the like. The display unit 123 is used to display information desired by the operator. The keyboard 124 and the mouse 125 are used by the operator to input instructions to the print data generation device 100.

The auxiliary storage device 121 stores a print data generation program P. The CPU 111 as a processor reads the print data generation program P stored in the auxiliary storage device 121 into the memory 112 and executes the program to implement various functions of the print data generation device 100. The memory 112 includes a random-access memory (RAM) and a read-only memory (ROM). The memory 112 functions as a work area for the CPU 111 to execute the print data generation program P stored in the auxiliary storage device 121. Note that the print data generation program P is provided by being stored in the computer-readable recording medium (non-transitory recording medium). That is, for example, a user purchases the optical disc 6 as the recording medium of the print data generation program P, inserts the optical disc 6 into the optical disc drive 122, reads the print data generation program P from the optical disc 6, and installs the print data generation program P in the auxiliary storage device 121. Alternatively, the print data generation program P transmitted via the network 5 may be received by the network interface unit 117 and installed in the auxiliary storage device 121.

4. Outline of Overall Process

The outline of the overall process in the present embodiment will be described. Conventionally, the operator has needed to perform determination of an accessory image and setting of the position of the accessory image one by one during the flatplan editing work. In contrast, in the present embodiment, data including information representing the content and position (arrangement position on printing paper) of an accessory image is prepared as accessory preset data in the print data generation device 100 in advance, and the operator may perform, as accessory design work, work of selecting accessory preset data depending on the processing type (bookbinding processing type) and the post-processing machine (processing device) to be used.

Figure 5:
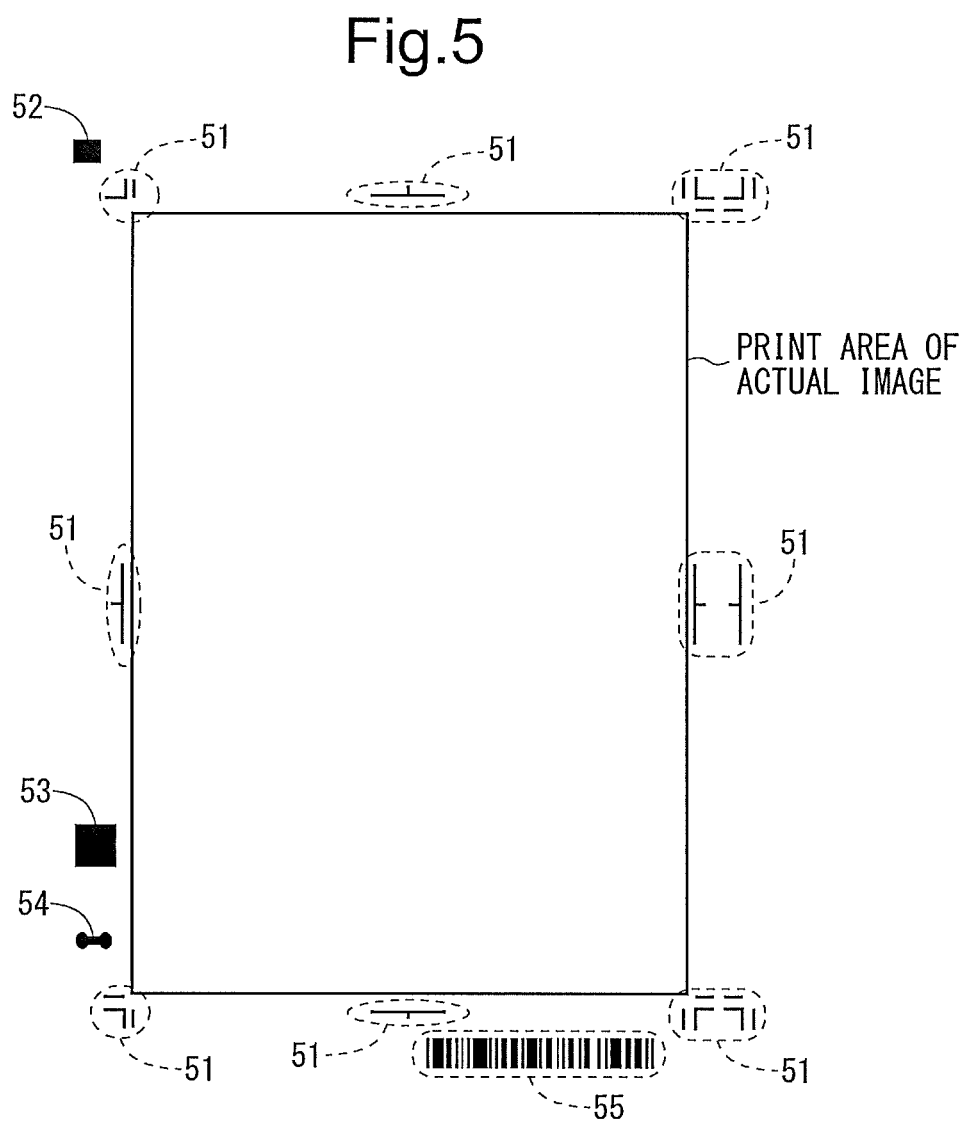

Here, the accessory image will be described with reference to FIG. 5. In a case in which post-processing is performed using the post-processing machines after printing on printing paper, for example, as illustrated in FIG. 5, the accessory image is placed (printed) outside the print area of the actual image on the printing paper. In the example illustrated in FIG. 5, a trim mark 51 serving as a mark at the time of cutting the printing paper, a print start mark 52 representing a start position of printing based on one print job, a section mark 53 representing a section separator, a cutter mark 54 referred to by the sheet cutter, and a barcode 55 for uniquely identifying a print job are arranged outside the print area of the actual image. A position where each accessory image is to be placed is determined according to the specifications of the post-processing machine that requires each accessory image. In this regard, for example, even when a folding machine with a model name "A" and a folding machine with a model name "B" are folding machines of the same manufacturer, a position where the accessory image required by the folding machine with the model name "A" is to be placed and a position where the accessory image required by the folding machine with the model name "B" is to be placed may be different depending on the specifications of these folding machines.

Figure 6:
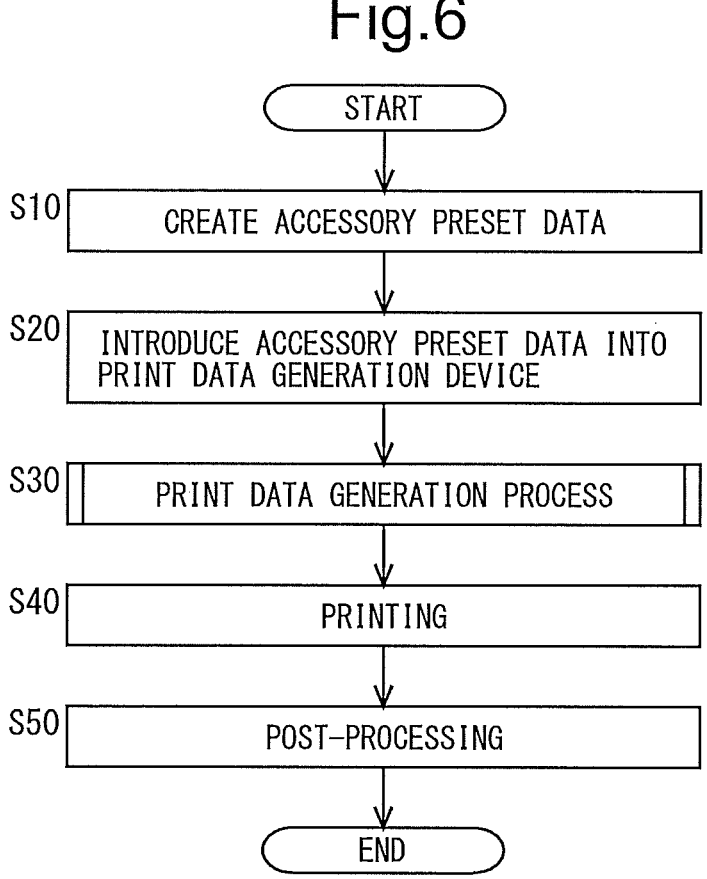
FIG. 6 is a flowchart showing the outline of the overall process flow in the embodiment.

The outline of the overall process flow in the present embodiment will be described with reference to the flowchart illustrated in FIG. 6. First, the accessory preset data described above is created in accordance with the specifications for each post-processing machine, using a personal computer or the like outside the printing system 1 illustrated in FIG. 1 (step S10). Note that a plurality of pieces of accessory preset data may be created for one post-processing machine. After the accessory preset data for each of the plurality of post-processing machines is created, the accessory preset data is introduced into the print data generation device 100 (step S20). Specifically, the accessory preset data is stored in an accessory preset data holding unit 10 to be described later. In this regard, typically, the accessory preset data holding unit 10 is implemented by the auxiliary storage device 121 (cf. FIG. 4), and when the print data generation program P is installed in the auxiliary storage device 121, the accessory preset data is also stored in the auxiliary storage device 121. After the introduction of the accessory preset data into the print data generation device 100, the print data generation device 100 performs a print data generation process (a process of generating print data for the inkjet printing apparatus 200 to perform printing on the printing paper PA). Note that a detailed procedure for the print data generation process will be described later. After the generation of print data, printing on the printing paper by the inkjet printing apparatus 200 is performed on the basis of the print data (step S40). Thereafter, post-processing by the post-processing machine included in the post-processing machine group 400 is performed on the printed printing paper depending on the processing type (bookbinding processing type) (step S50). In this manner, a final product such as a book is obtained.

Figure 7:
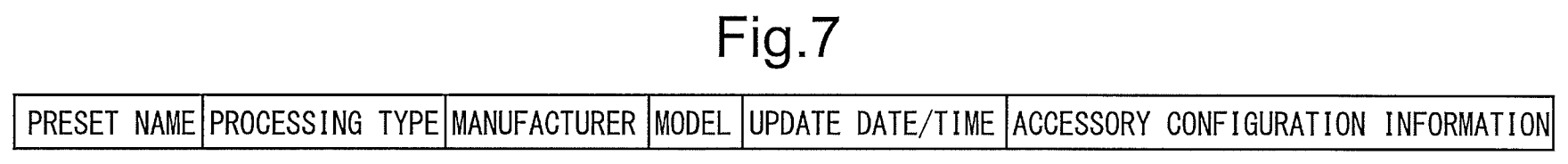

Next, the accessory preset data created in step S10 will be described. FIG. 7 is a diagram showing an example of the data structure of the accessory preset data. As illustrated in FIG. 7, the accessory preset data includes, as data items, a preset name, a processing type, a manufacturer, a model, an update date and time, and accessory configuration information. The preset name is a name for uniquely identifying a record as the accessory preset data.

In the present embodiment, the accessory identifier is implemented by the preset name. The accessory configuration information is information representing the accessory image itself and information representing the arrangement position of the accessory image. That is, the accessory configuration information is information necessary for printing the accessory image. However, the column of the data item "Accessory configuration information" in the accessory preset data typically contains information on link destination that holds information necessary for printing the accessory image.

5. Functional Configuration of Print Data Generation Device

FIG. 8 is a block diagram showing a functional configuration implemented by the CPU 111 executing the print data generation program P using the memory 112 in the print data generation device 100. In FIG. 8, components not directly related to the present invention are omitted. By executing the print data generation program P, as illustrated in FIG. 8, the print data generation device 100 is provided with the accessory preset data holding unit 10, a processing type selection unit 11, an imposition designation unit 12, an accessory preset selection unit 13, an accessory-included imposition data generation unit 14, a correction unit 15, an overall imposition processing unit 16, and a rasterization processing unit 17. The accessory preset selection unit 13 includes an accessory preset list display unit 131 and a filtering unit 132.

The accessory preset data holding unit 10 holds the accessory preset data described above in which accessory configuration information, which is information necessary for printing an accessory image to be placed outside a print area of an actual image based on submitted data on printing paper, is associated with a preset name for identifying the accessory configuration information and a processing type indicating a mode of post-processing (a series of processing to be performed after the printing process by the inkjet printing apparatus 200). Note that, as described above, the accessory preset data holding unit 10 is implemented by the auxiliary storage device 121.

The processing type selection unit 11 presents a plurality of processing types on the display unit 123 and accepts the selection of a processing type by the operator. The imposition designation unit 12 displays a screen for designating an imposition mode representing the arrangement of one or more pages on the printing paper on the display unit 123, and accepts the designation of an imposition mode by the operator.

The accessory preset selection unit 13 presents one or more preset names for identifying one or more pieces of accessory configuration information associated with the processing type accepted by the processing type selection unit 11 on the accessory preset list display unit 131 with reference to the accessory preset data held in the accessory preset data holding unit 10, and accepts the selection of a preset name by the operator. When the accessory preset data is presented on the accessory preset list display unit 131, filtering is performed by the filtering unit 132. Specifically, in a case in which the manufacturer is designated by the operator, only the preset name identifying the accessory configuration information associated with the designated manufacturer is presented on the accessory preset list display unit 131 by the filtering unit 132. In a case in which the model of the post-processing machine (processing device) is designated by the operator, only the preset name identifying accessory the configuration information associated with the designated model is presented on the accessory preset list display unit 131 by the filtering unit 132. In a case in which both the manufacturer and the model are designated by the operator, only the preset name identifying the accessory configuration information associated with both the designated manufacturer and the designated model is presented on the accessory preset list display unit 131 by the filtering unit 132. The accessory preset selection unit 13 is configured to be able to accept the selection of a preset name by the operator a plurality of times for one printing process. In the present embodiment, the accessory selection unit is implemented by the accessory preset selection unit 13, the accessory list display unit is implemented by the accessory preset list display unit 131, the accessory data is implemented by the accessory preset data, and the accessory identifier is implemented by the preset name.

The accessory-included imposition data generation unit 14 generates accessory-included imposition data 31 by adding an accessory image based on the accessory configuration information identified by the preset name accepted by the accessory preset selection unit 13 to imposition data indicating the imposition mode accepted by the imposition designation unit 12. Note that the accessory-included imposition data 31 is temporarily stored in the auxiliary storage device 121 or the memory 112 in the print data generation device 100.

The correction unit 15 corrects the accessory image included in the accessory-included imposition data 31 on the basis of the operation by the operator. In the present embodiment, the accessory-included imposition data correction unit is implemented by the correction unit 15.

The overall imposition processing unit 16 generates print data 33 by imposing all pages included in the submitted data 32 on the basis of the accessory-included imposition data 31. The rasterization processing unit 17 performs a rasterization process on the print data 33 generated by the overall imposition processing unit 16 to generate rasterized print data 34.

6. Print Data Generation Process (Print Data Generation Method)

Figure 9:
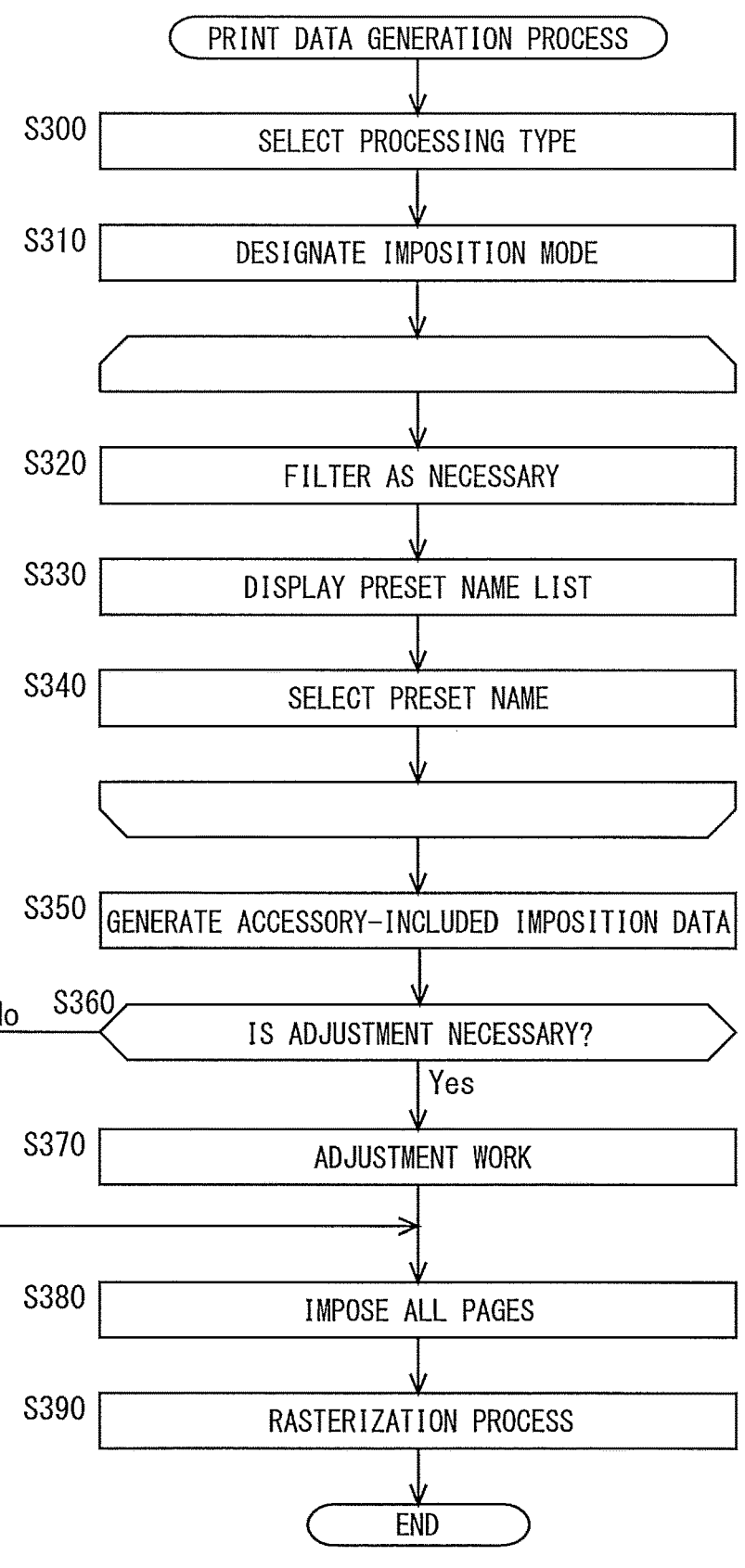
FIG. 9 is a flowchart showing a procedure for a print data generation process in the embodiment.

Next, a procedure for the print data generation process in the present embodiment will be described with reference to a flowchart illustrated in FIG. 9. However, descriptions of processes not directly related to the present invention are omitted here. Further, it is assumed here that the accessory preset data as illustrated in FIG. 10 is held in the accessory preset data holding unit 10.

Figure 11:
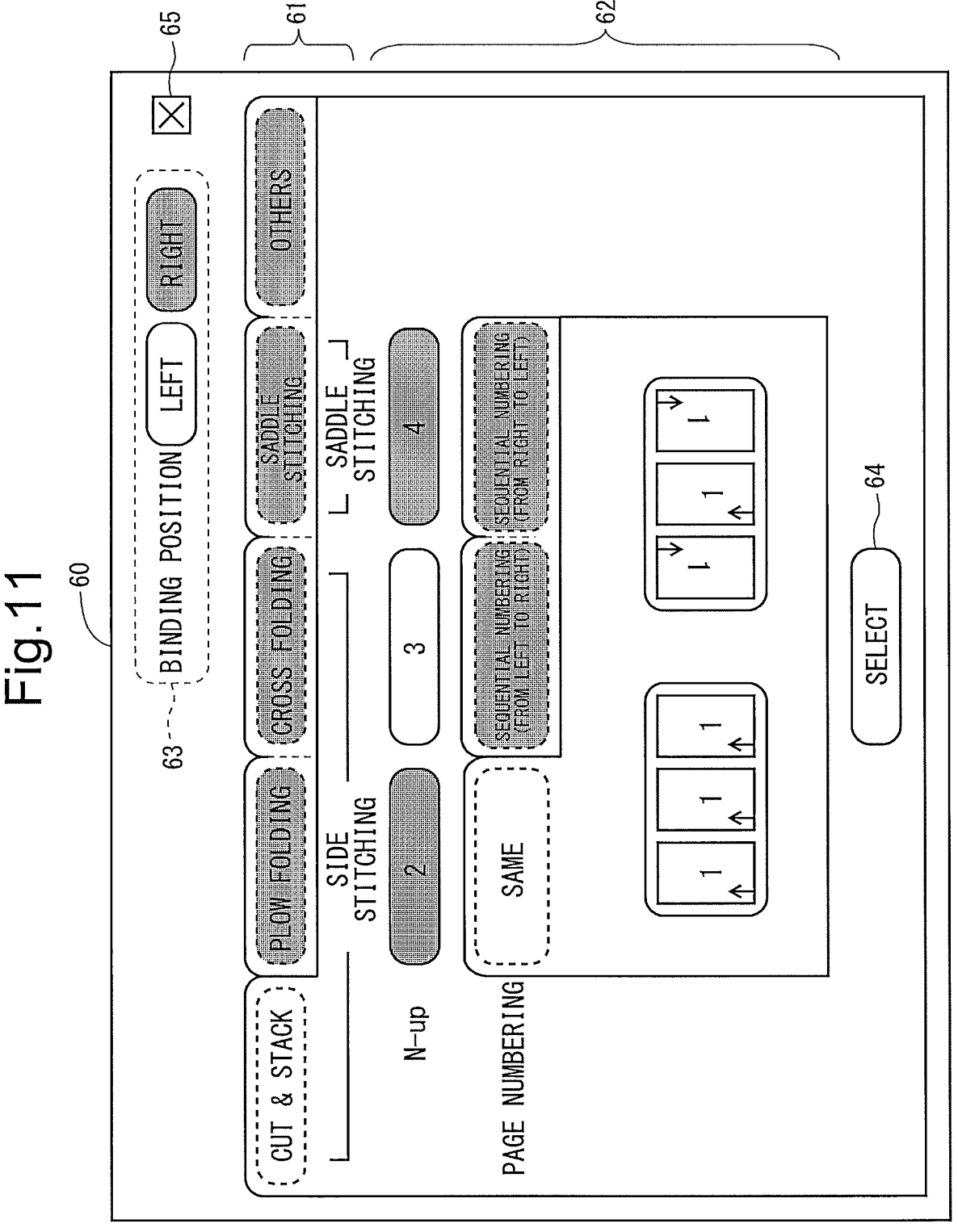
FIG. 11 is a diagram showing an example of a flatplan edit screen in the embodiment.

After the start of the print data generation process, first, a processing type for post-processing is selected by the operator (step S300). Specifically, in step S300, first, a screen (hereinafter referred to as a "flatplan edit screen") 60 as illustrated in FIG. 11, which is a screen for the operator to select a processing type and designate an imposition mode, is displayed on the display unit 123 by the processing type selection unit 11.

The flatplan edit screen 60 includes a processing type selection area 61 and an imposition mode designation area 62. The processing type selection area 61 is configured to be able to switch tabs. The processing type and the tab correspond to each other on a one-to-one basis, and the operator selects a tab corresponding to a desired processing type. That is, the processing type is selected by selecting the tab. In the example illustrated in FIG. 11, with the exception of "Others", four processing types of "Cut and stack", "Plow folding", "Cross folding", and "Saddle stitching" are presented in the processing type selection area 61. The imposition mode designation area 62 is configured to allow the operator to designate the imposition mode. The content displayed in the imposition mode designation area 62 varies depending on the processing type selected by the operator. The content displayed in the imposition mode designation area 62 in FIG. 11 is content in a state where "Cut and stack" is selected as the processing type. Note that the term "N-up" represents the number of pages included in one sheet.

The flatplan edit screen 60 also includes a binding position designation area 63, a select button 64, and a close button 65. The binding position designation area 63 is an area for the operator to designate whether the binding position is set to the left or right at the time of bookbinding. The select button 64 is a button to be pressed after the operator has selected a processing type and designates an imposition mode. The close button 65 is a button to be pressed by the operator when the flatplan edit screen 60 is hidden.

Note that presentation of a plurality of processing types in the processing type selection area 61 in the flatplan edit screen 60 and acceptance of the selection of a processing type in the processing type selection area 61 are performed by the processing type selection unit 11.

Figure 12:
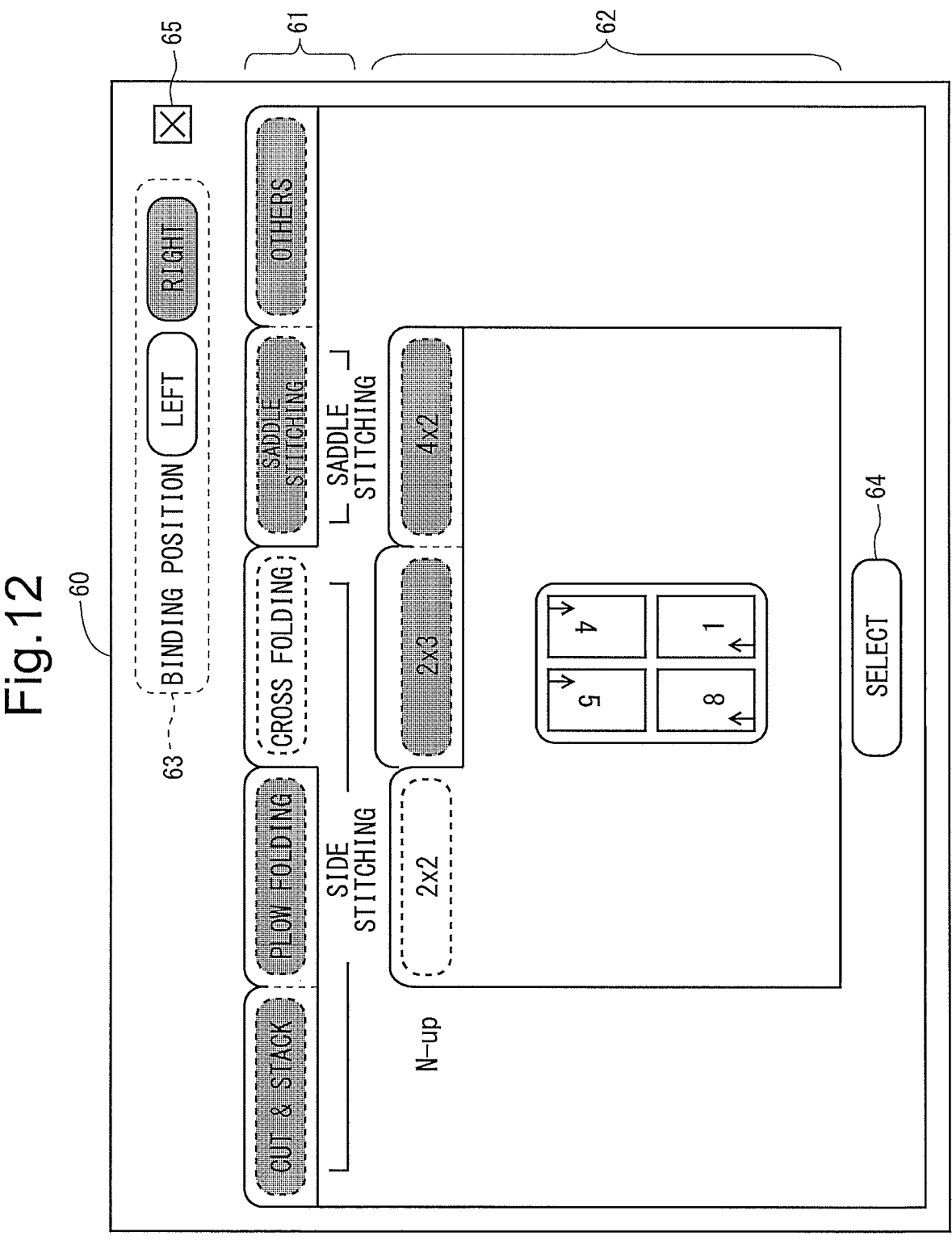
FIG. 12 is a diagram showing an example of the flatplan edit screen after the processing type is selected in the embodiment.

After the processing type for post-processing is selected on the flatplan edit screen 60, an imposition mode (arrangement of one or more pages on the printing paper) is designated by the operator (step S310). Here, it is assumed that "Cross folding" is selected by the operator in step S300. In this case, the flatplan edit screen 60 is a screen as illustrated in FIG. 12. In this example, the imposition mode designation area 62 is configured such that N-up can be designated from "2×2", "2×3", and "4×2". The selection of one of "2×2", "2×3", and "4×2" corresponds to the designation of an imposition mode. An imposition mode is designated by the operator in this manner in step S310, and the designation is accepted by the imposition designation unit 12.

Figure 13:
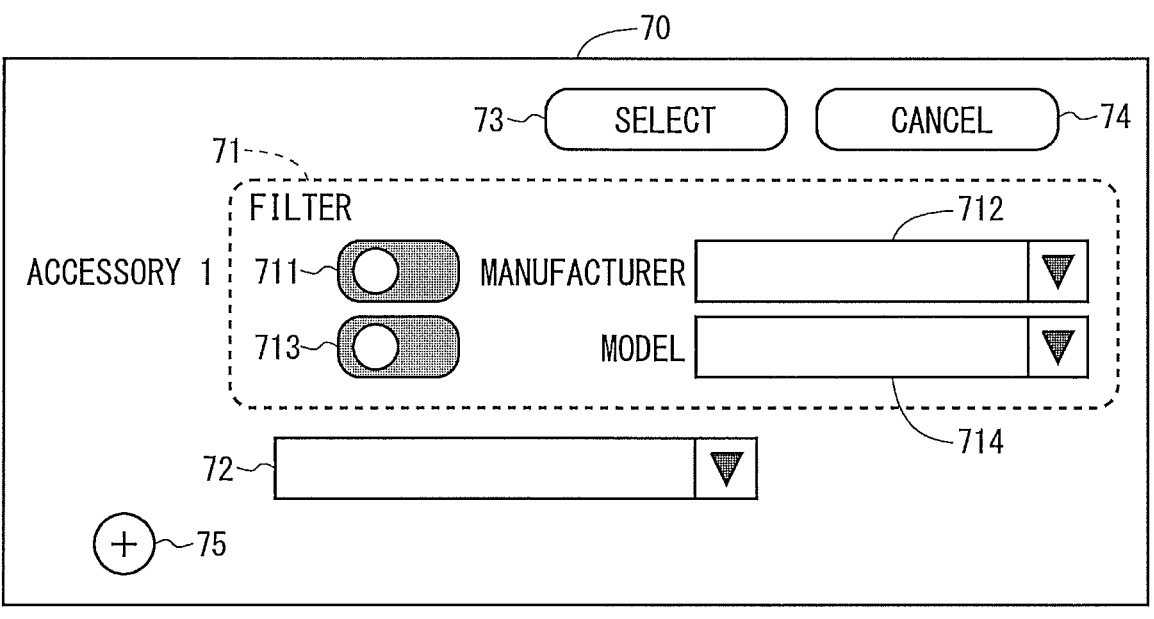
FIG. 13 is a diagram showing an example of an accessory preset selection screen in the embodiment.

Thereafter, the processes in steps S320 to S340 are typically repeated as many times as the number of post-processing machines each requiring the accessory image among the post-processing machines used in the post-processing. Meanwhile, when the select button 64 is pressed by the operator on the flatplan edit screen 60 illustrated in FIG. 12, a screen (hereinafter referred to as an "accessory preset selection screen") 70 as illustrated in FIG. 13, which is a screen for the operator to select a preset name, is displayed on the display unit 123 by the accessory preset selection unit 13. The processes in steps S320 to S340 are performed in a state where the accessory preset selection screen 70 is displayed.

As illustrated in FIG. 13, the accessory preset selection screen 70 includes a filtering designation area 71, a dropdown list 72, a select button 73, a cancel button 74, and an add button 75. The filtering designation area 71 is configured to allow the operator to set filtering of the preset name displayed in the dropdown list 72. A list of selectable preset names is presented in the dropdown list 72, and one can be selected from the one or more preset names presented. The select button 73 is a button to be pressed after the operator has selected one preset name from the dropdown list 72. The cancel button 74 is a button to be pressed when the operator desires to cancel the operation performed using this accessory preset selection screen 70. The add button 75 is a button pressed by the operator when it is necessary to add a preset name to be selected.

Figure 14:
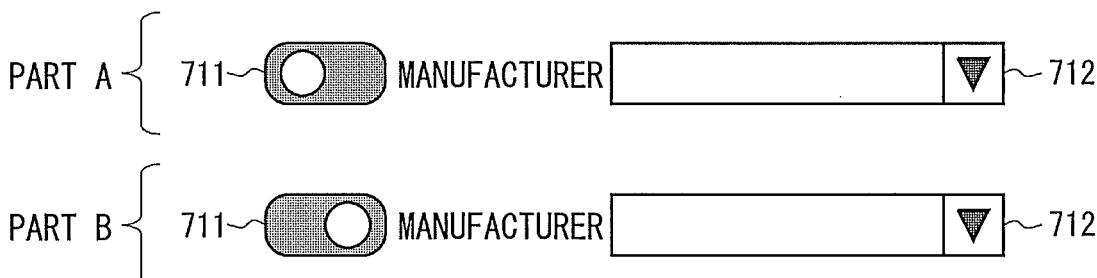
FIG. 14 is a diagram for describing an on/off button included in the accessory preset selection screen in the embodiment.

The filtering designation area 71 includes an on/off button 711, a dropdown list 712, an on/off button 713, and a dropdown list 714. The on/off button 711 is a button for setting whether or not to enable filtering based on the manufacturer. A list of selectable manufacturers is presented in the dropdown list 712, and one can be selected from the one or more manufacturers presented. The on/off button 713 is a button for setting whether or not to enable filtering based on the model of the post-processing machine (processing device). A list of selectable models is presented in the dropdown list 714, and one can be selected from the one or more models presented. Note that the filtering based on the manufacturer is enabled when the on/off button 711 is in a state illustrated in part A of FIG. 14, and the filtering based on the manufacturer is disabled when the on/off button 711 is in a state illustrated in part B of FIG. 14. The same applies to the on/off button 713.

Figure 15:
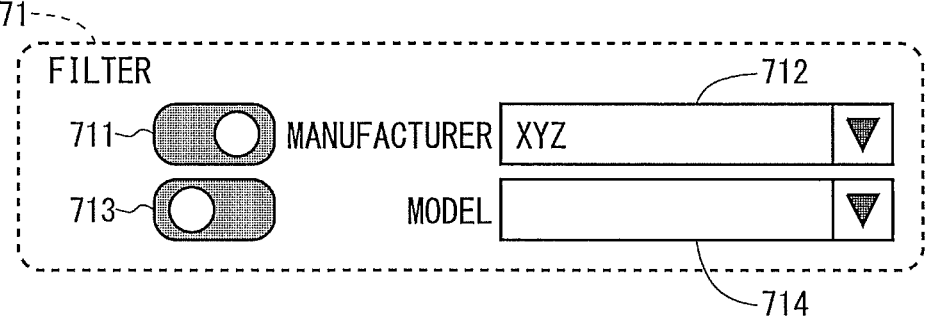
FIG. 15 is a diagram showing an example of settings used for filtering preset names in the embodiment.

After the display of the accessory preset selection screen 70 as described above, filtering of the preset names displayed in the dropdown list 72 is performed as necessary (step S320). In step S320, the operator sets filtering in the filtering designation area 71. For example, when performing filtering based on a manufacturer "XYZ", the operator sets filtering as illustrated in FIG. 15. When the operator sets the filtering, the filtering unit 132 extracts the accessory preset data matching the set condition from the accessory preset data holding unit 10.

Figure 16:
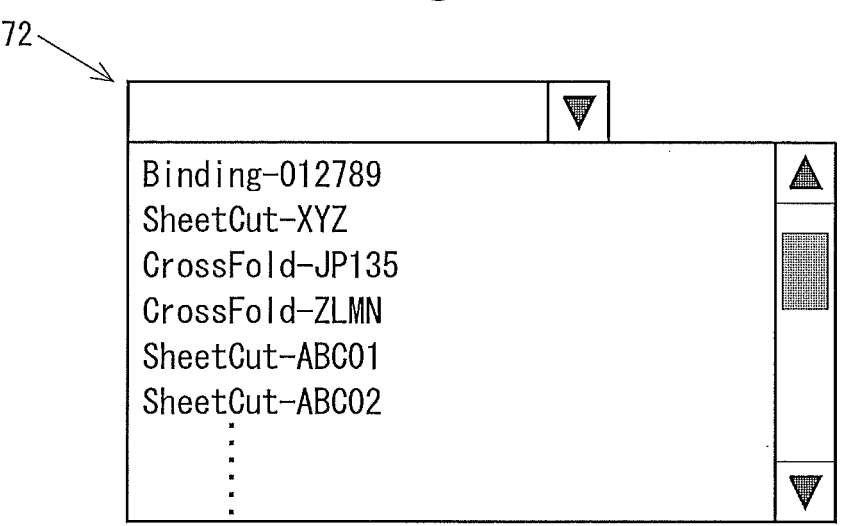
FIG. 16 is a diagram for describing presentation of a list of preset names in a dropdown list in the accessory preset selection screen in the embodiment.
Figure 17:
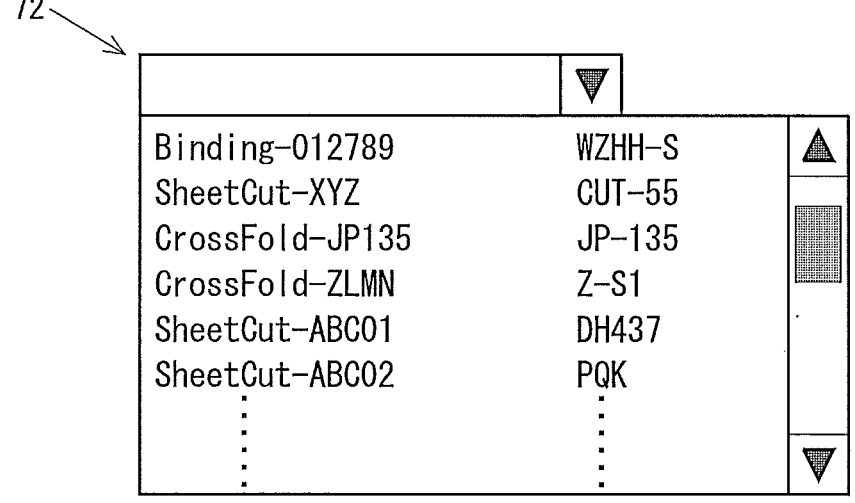
FIG. 17 is a diagram for describing presentation of a list of preset names in a dropdown list in the accessory preset selection screen in the embodiment.

In step S330, a list of preset names selectable by the operator is presented in the dropdown list 72 in the accessory preset selection screen 70. In this regard, in a case in which no setting has been made to perform filtering in the filtering designation area 71 in the accessory preset selection screen 70, all the preset names associated with the processing type designated in step S300 are presented in the dropdown list 72. In a case in which a setting has been made to perform filtering based on the manufacturer in the filtering designation area 71, only the preset name associated with the manufacturer designated by the operator is presented in the dropdown list 72. In a case in which a setting has been made to perform filtering based on the model in the filtering designation area 71, only the preset name associated with the model designated by the operator is presented in the dropdown list 72. In a case in which a setting has been made to perform filtering based on the manufacturer and the model in the filtering designation area 71, only the preset name associated with both the manufacturer and the model designated by the operator is presented in the dropdown list 72. In step S320, for example, as illustrated in FIG. 16, a list of selectable preset names is presented in a dropdown list 72. Note that, for example, as illustrated in FIG. 17, the selectable preset name and information on the model associated with the preset name may also be presented in the dropdown list 72.

Figures 20, 21:
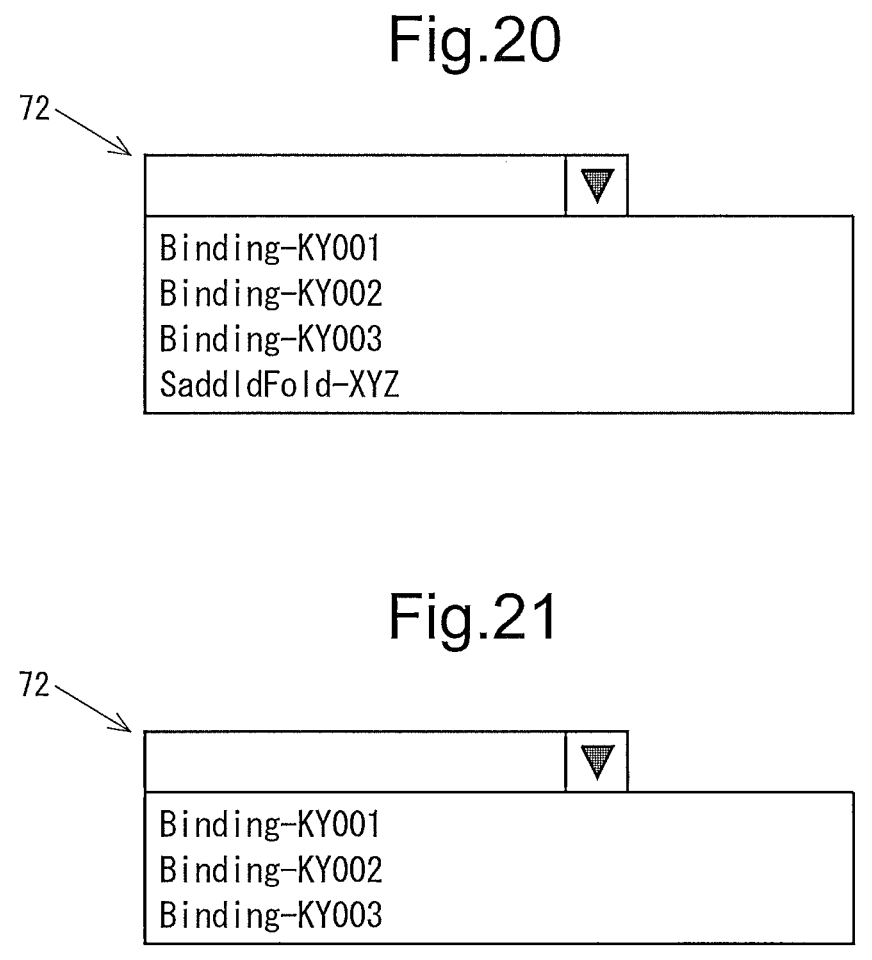

As described above, it is assumed here that the accessory preset data as illustrated in FIG. 10 is held in the accessory preset data holding unit 10. Under this assumption, in a case in which no setting has been made for filtering and "Saddle stitching" has been selected as the processing type, a list of a plurality of preset names as illustrated in FIG. 18 is presented in the dropdown list 72. Further, in a case in which no setting has been made for filtering and "Cross folding" has been selected as the processing type, a list of a plurality of preset names as illustrated in FIG. 19 is presented in the dropdown list 72. Moreover, in the state illustrated in FIG. 18, when a setting is made to perform filtering based on a manufacturer "XYZ" in the filtering designation area 71, the list of preset names presented in the dropdown list 72 is as illustrated in FIG. 20. Furthermore, in the state illustrated in FIG. 20, when a setting is made to perform filtering based on a model "KY" in the filtering designation area, the list of preset names presented in the dropdown list 72 is as illustrated in FIG. 21.

After the list of preset names has been presented in the dropdown list 72 in the accessory preset selection screen 70 as described above, a preset name is selected by the operator (step S340). The selection of a preset name by the operator is accepted by the accessory preset selection unit 13.

Figure 22:
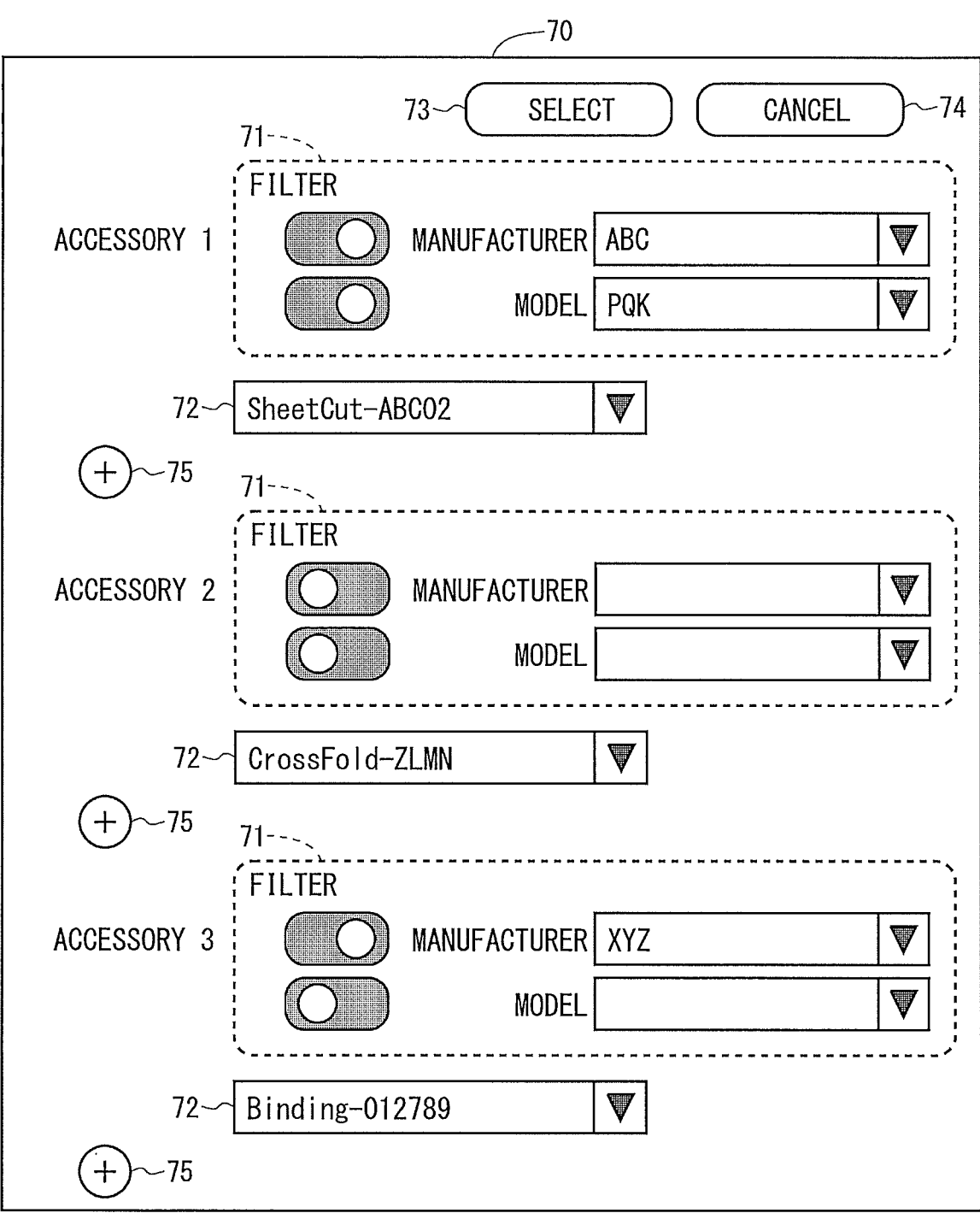
FIG. 22 is a diagram showing an example of the accessory preset selection screen when three preset names are selected in the embodiment.

As described above, the processes in steps S320 to S340 as above are typically repeated as many times as the number of post-processing machines each requiring the accessory image among the post-processing machines used in the post-processing. FIG. 22 illustrates an example of the accessory preset selection screen 70 after the processes in steps S320 to S340 have been repeated three times. In this example, the preset name of the accessory preset data necessary for the process by the sheet cutter 410 is selected in an "Accessory 1" field, the preset name of the accessory preset data necessary for the process by the folding machine 420 is selected in an "Accessory 2" field, and the preset name of the accessory preset data necessary for the process by the binding machine 440 is selected in an "Accessory 3" field.

Figures 23, 24:
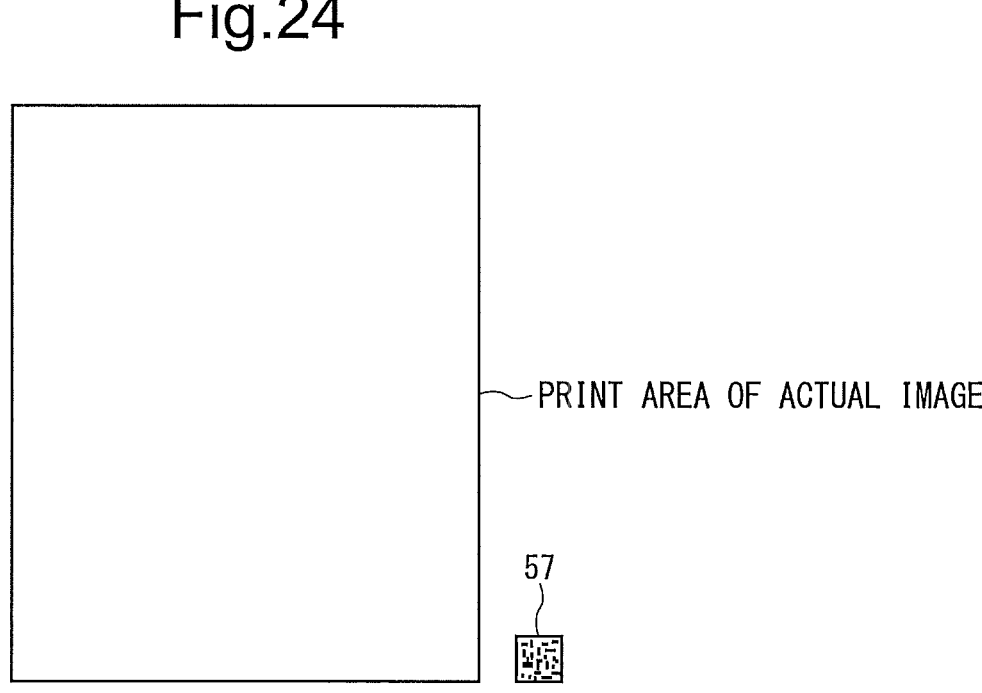
FIG. 23 is a diagram for describing generation of accessory-included imposition data in the embodiment.
FIG. 24 is a diagram for describing generation of accessory-included imposition data in the embodiment.
Figure 25:
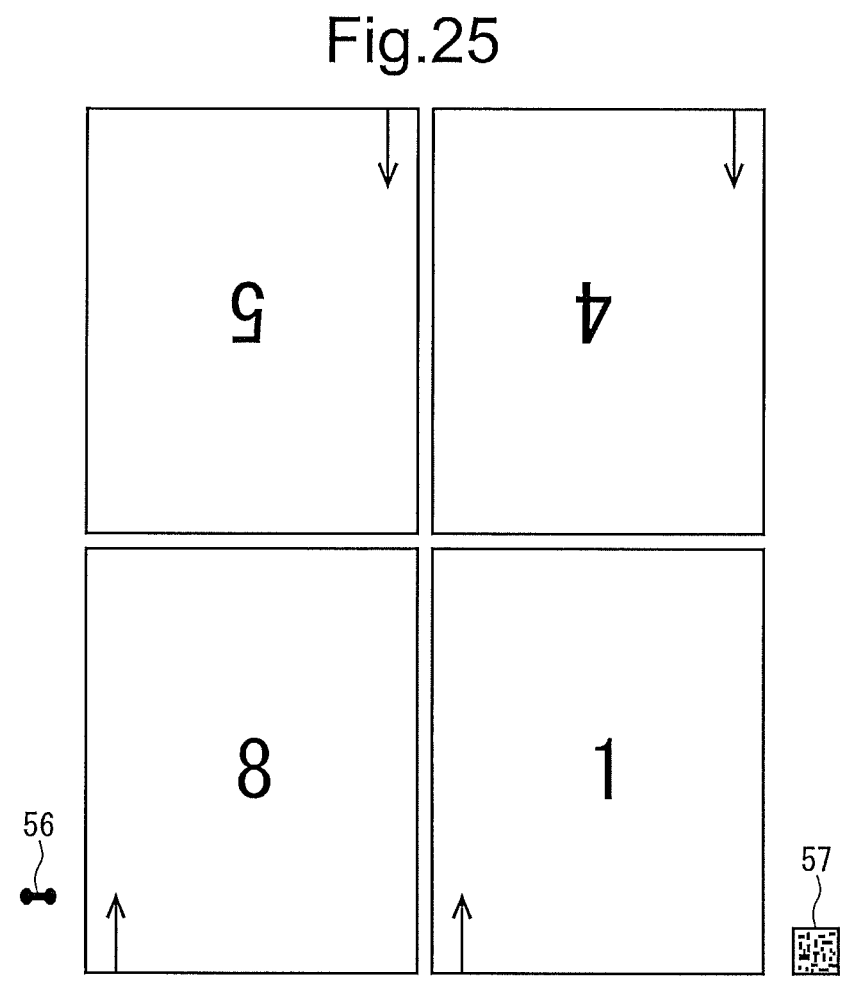

After a necessary number of pieces of accessory preset data (preset names) have been selected by repeating the processes in steps S320 to S340, the accessory-included imposition data generation unit 14 adds the accessory image based on the accessory configuration information identified by the preset name selected in step S340 to imposition data indicating the imposition mode designated in step S310, thereby generating the accessory-included imposition data 31 (step S350). In this regard, in a case in which accessory preset data schematically represented as shown in FIG. 23 including a cutter mark 56 as an accessory image and accessory preset data schematically represented as shown in FIG. 24 including a two-dimensional code 57 as an accessory image have been selected on the accessory preset selection screen 70, the accessory-included imposition data 31 schematically represented as shown in FIG. 25 including the cutter mark 56 and the two-dimensional code 57 is generated in step S350.

Figure 26:
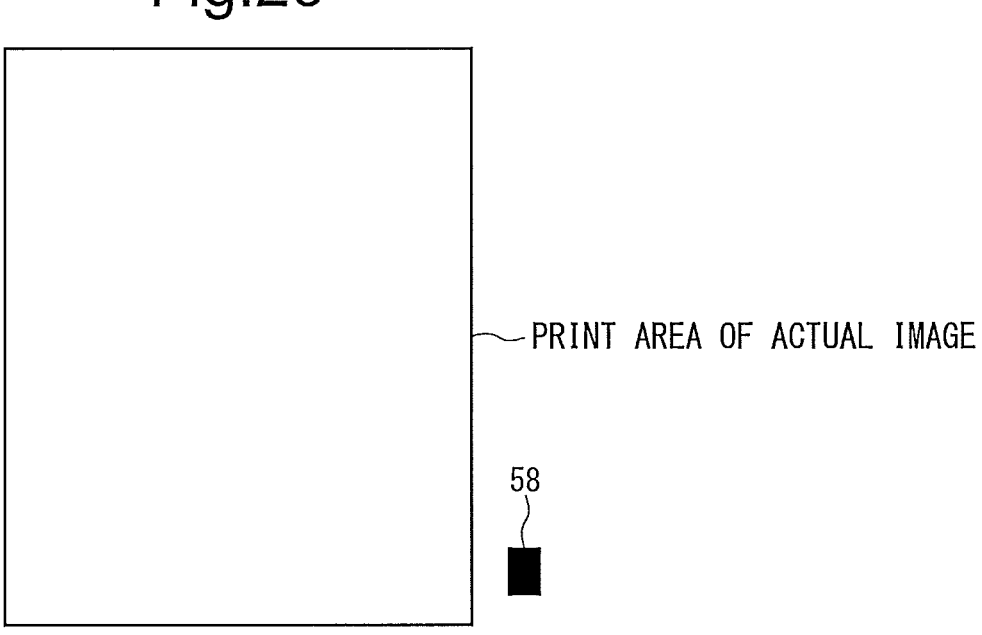
FIG. 26 is a diagram for describing the need to adjust a position and the like of an accessory image in the embodiment.
Figure 27:
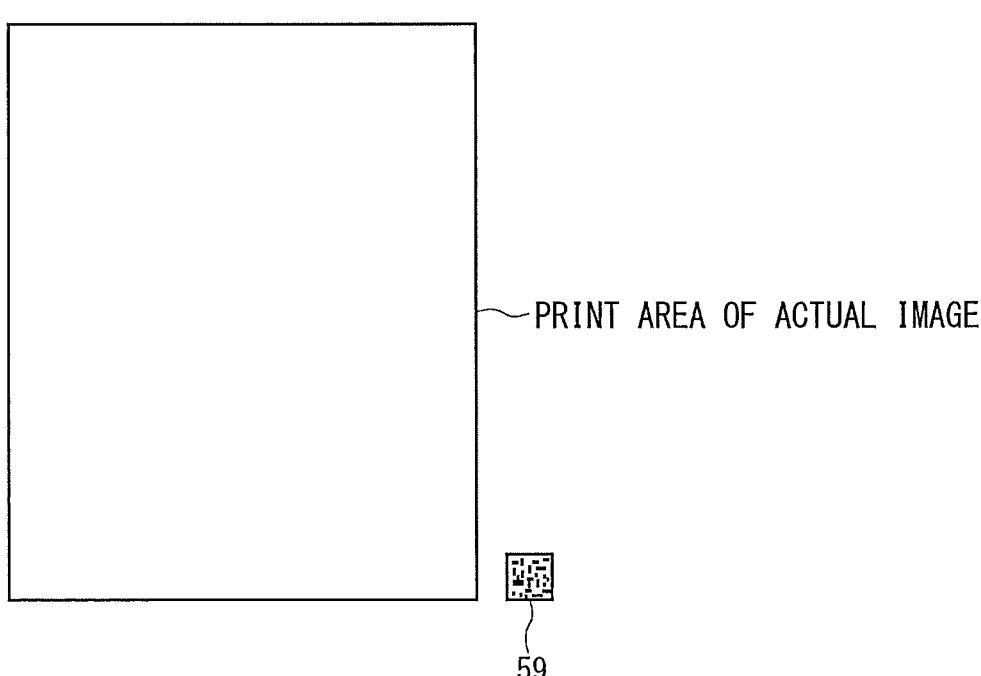
FIG. 27 is a diagram for describing the need to adjust a position and the like of an accessory image in the embodiment.
Figure 28:
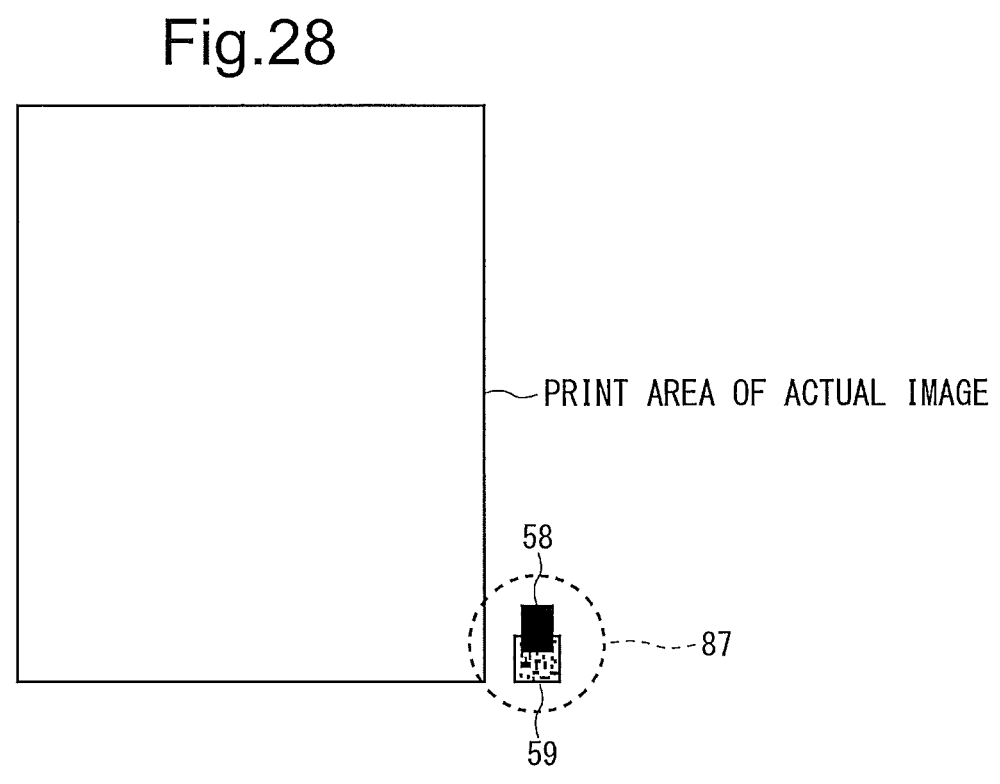

After the generation the accessory-included imposition data 31, an image corresponding to the accessory-included imposition data 31 is displayed on the display unit 123, and the operator determines whether it is necessary to adjust the position and the like of the accessory image (step S360). In this regard, for example, in a case in which accessory preset data schematically represented as shown in FIG. 26 including a section mark 58 as an accessory image and accessory preset data schematically represented as shown in FIG. 27 including a two-dimensional code 59 as an accessory image have been selected on the accessory preset selection screen 70, the accessory-included imposition data 31 schematically represented as shown in FIG. 28 is generated in step S350. In a portion denoted by reference numeral 87 in FIG. 28, the section mark 58 and the two-dimensional code 59 have overlapped. When the plurality of accessory images have overlapped each other as described above, the post-processing machine does not correctly perform the processing. Therefore, the print data generation device 100 is provided with the correction unit 15 described above to correct the accessory image included in the accessory-included imposition data 31. The need for adjustment (e.g., adjustment of the position and the like of the accessory image) using this correction unit 15 is determined in step S360.

When a plurality of preset names are selected in step S340 (when the accessory preset selection unit 13 accepts the selection of a plurality of preset names), the accessory-included imposition data generation unit 14 may determine in step S360 whether an overlap has occurred in a plurality of accessory images based on a plurality of pieces of accessory configuration information identified by the plurality of preset names. Then, when an overlap has occurred in the plurality of accessory images, a message may be displayed on the display unit 123, for example.

When it is determined in step S360 that adjustment is necessary, the process proceeds to step S370. In contrast, when it is determined in step S360 that adjustment is not necessary, the process proceeds to step S380.

Figure 29:
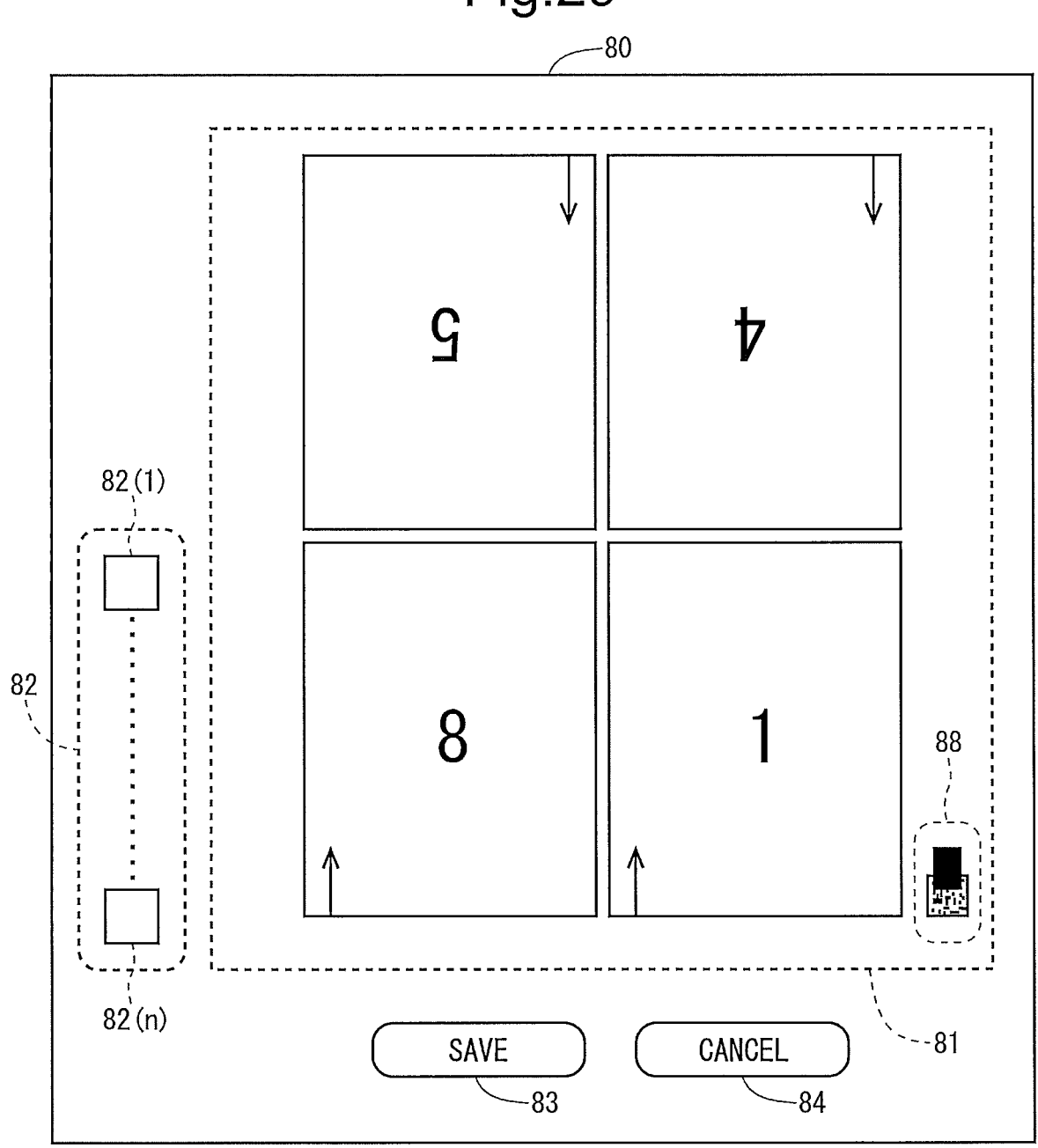
FIG. 29 is a diagram showing an example of a detail edit screen in the embodiment.

In step S370, the position and the like of the accessory image constituting the accessory-included imposition data 31 is adjusted by the operator. In step S370, first, the operator selects a predetermined menu, whereby a detail edit screen 80 for editing operation, for example, as illustrated in FIG. 29 is displayed on the display unit 123 by the correction unit 15. The detail edit screen 80 includes an edit area 81, an edit icon area 82, a save button 83, and a cancel button 84. The edit area 81 is an area where the operator can edit the accessory image.

The edit icon area 82 includes n icons 82(1) to 82(n) to be pressed by the operator at the time of executing various operations. The save button 83 is a button to be pressed by the operator at the time of saving the accessory-included imposition data 31 after the editing of the accessory image.

The cancel button 84 is a button to be pressed by the operator at the time of canceling all the editing work performed on the accessory image.

Figure 30:
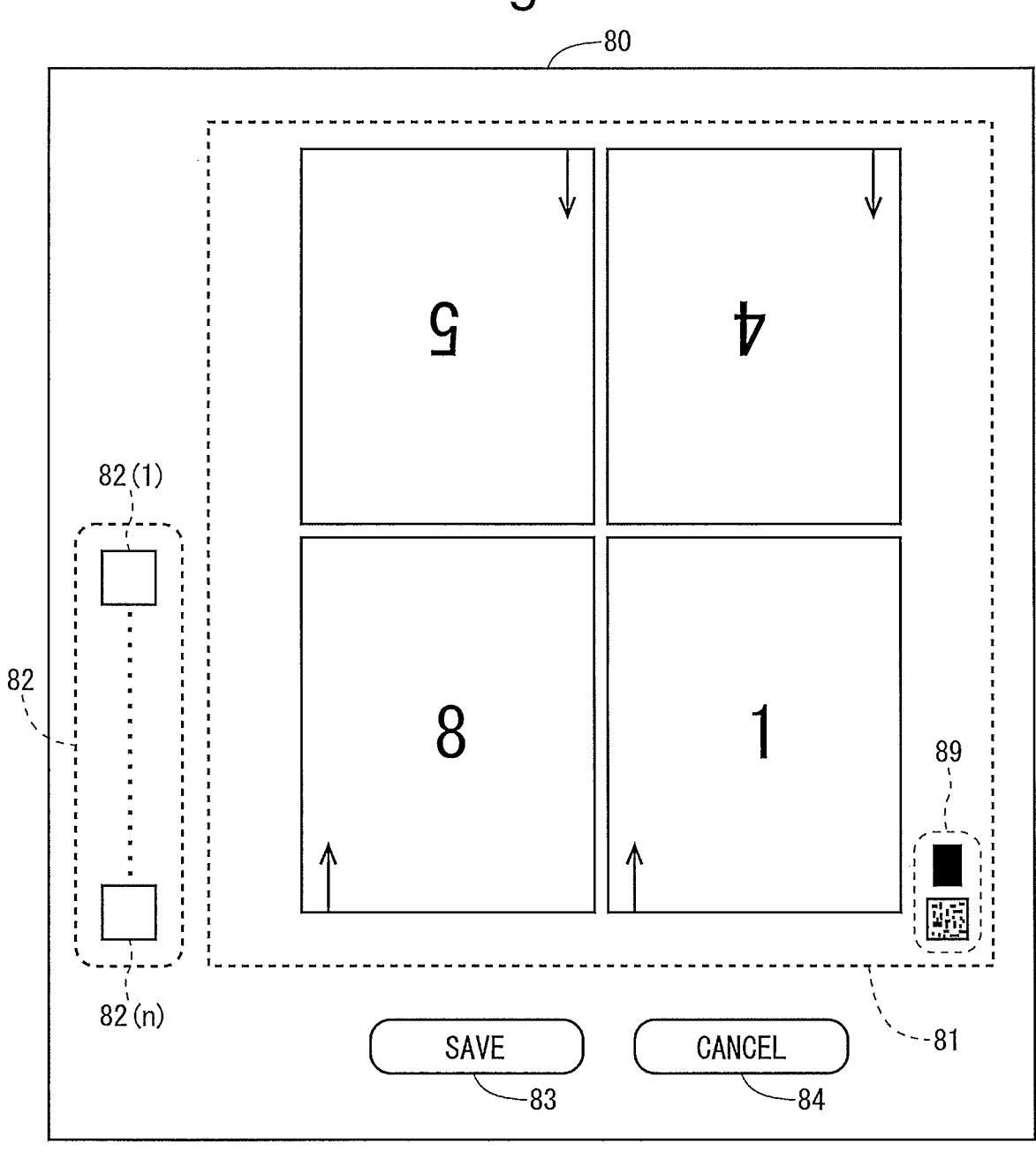
FIG. 30 is a diagram showing an example of a detail edit screen after the positions of the accessory images have been adjusted in the embodiment.

When the detail edit screen 80 is used, in the case of an overlap having occurred in accessory images as in a portion denoted by reference numeral 88 in FIG. 29, the positions of the accessory images can be adjusted to eliminate the overlap in the accessory images as in a portion denoted by reference numeral 89 in FIG. 30. Since the accessory image can be edited in this manner, it is possible to prevent the processing in the post-processing machine from stopping due to the overlap of the plurality of accessory images.

In step S380, the overall imposition processing unit 16 imposes all the pages included in the submitted data 32 on the basis of the accessory-included imposition data 31 (step S380). As a result, print data 33 is generated.

Thereafter, the rasterization processing unit 17 performs a rasterization process on the print data 33 generated in step S380, thereby generating the rasterized print data 34 (step S390). Accordingly, the print data generation process ends.

In the present embodiment, the processing type selection step is implemented by step S300, the imposition designation step is implemented by step S310, the accessory selection step is implemented by steps S320 to S340, the accessory-included imposition data generation step is implemented by step S350, and the overall imposition processing step is implemented by step S380.

7. EFFECTS

According to the present embodiment, accessory preset data that associates accessory configuration information, which is information necessary for printing an accessory image, with a preset name for identifying the accessory configuration information and a processing type indicating a mode of post-processing (a series of processing to be performed after the printing process) has been prepared in the print data generation device 100 in advance. Under such an assumption, in the print data generation process, after the display of the flatplan edit screen 60 that allows the operator to select a processing type and designate an imposition mode, the accessory preset selection screen 70 including the dropdown list 72 that presents a list of preset names of accessory preset data each associated with the processing type selected by the operator is displayed. When the operator selects one or more preset names, accessory-included imposition data is generated by adding one or more accessory images identified by the one or more preset names selected to imposition data indicating the imposition mode designated by the operator. Since the accessory preset data including the accessory configuration information described above is prepared in advance in the print data generation device 100, when the preset name is appropriately selected, the desired accessory-included imposition data 31 in consideration of the specifications of one or more post-processing machines used for post-processing is generated. As above, according to the present embodiment, it is possible to implement the print data generation device capable of appropriately and promptly performing flatplan editing work including accessory design work regardless of the degree of skill in the work. Further, since the accessory image is prevented from being placed at an inappropriate position on the printing paper, the need for reprinting is reduced compared to the past, which can lead to decreased consumption of printing paper and ink. In this way, it is possible to contribute to the achievement of the sustainable development goals (SDGs).

8. MODIFICATIONS

Modifications of the above embodiment will be described below. Hereinafter, only differences from the above embodiment will be described.

8.1 First Modification

In the above embodiment, filtering based on the manufacturer and filtering based on the model have been possible for the preset names presented in the dropdown list 72 in the accessory preset selection screen 70. However, the present invention is not limited thereto, and filtering based on a text string may be possible as described below.

In the present modification, the accessory preset data includes, as the data item, "Comments" instead of "Model" in the above embodiment. The column of the data item "Comments" in the accessory preset data held in the accessory preset data holding unit 10 contains model information and information necessary for operation.

Figure 31:
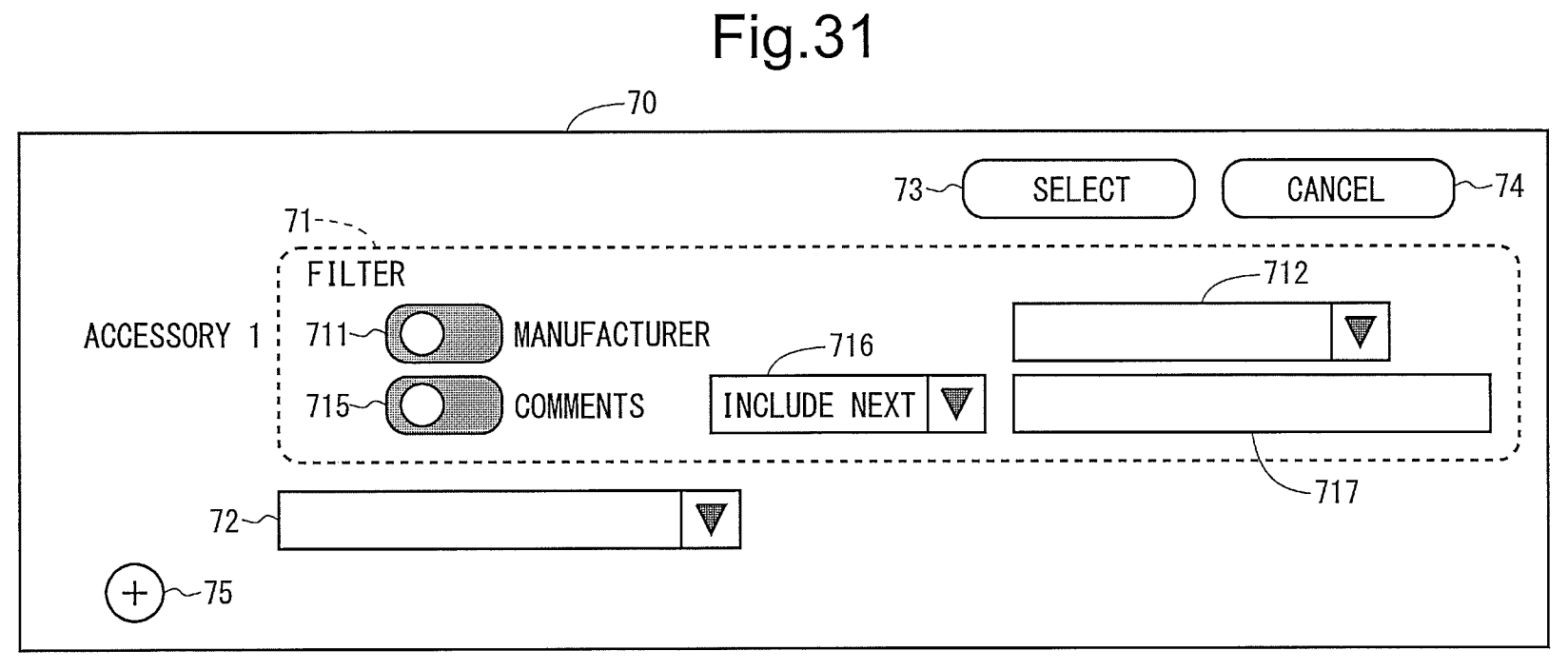

FIG. 31 is a diagram showing an example of the accessory preset selection screen 70 according to the present modification. The filtering designation area 71 in this accessory preset selection screen 70 includes the on/off button 711, the dropdown list 712, an on/off button 715, a dropdown list 716, and a text box 717. The on/off button 715 is a button for setting whether or not to enable filtering based on the text string. A plurality of filtering conditions are presented in the dropdown list 716, and one can be selected from the plurality of conditions presented. Examples of the conditions presented in the dropdown list 716 include "Include next", "Do not include next", and "Match next completely". A text string for filtering can be inputted into the text box 717.

Figure 32:
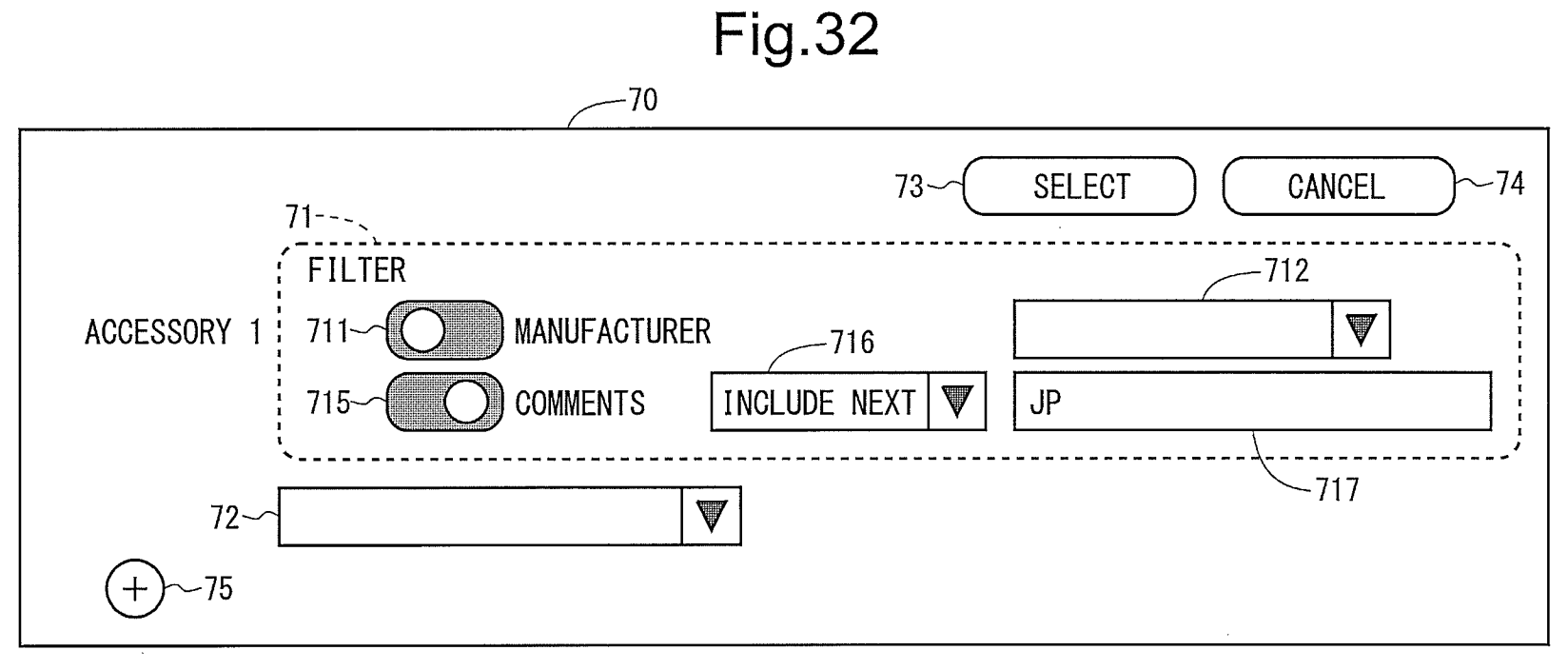

For example, in a case in which only a preset name of accessory preset data having comments including a text string "JP" (a preset name for identifying accessory configuration information associated with comments including a text string "JP") is to be presented in the dropdown list 72 in the accessory preset selection screen 70, the operator sets filtering as illustrated in FIG. 32.

8.2 Second Modification

In the above embodiment, it has been assumed that accessory preset data created by a personal computer or the like outside the printing system 1 is introduced into the print data generation device 100 in the printing system 1. However, as described below, components for generating accessory preset data may be provided in the print data generation device 100.

In the present modification, the print data generation device 100 is provided with an accessory preset data automatic generation unit 18 as illustrated in FIG. 33 in addition to the components (cf. FIG. 8) in the above embodiment. The accessory preset data automatic generation unit 18 is a functional component implemented by the CPU 111 executing the print data generation program P using the memory 112 in the print data generation device 100. The accessory preset data automatic generation unit 18 acquires device information in a predetermined format representing the specifications of the post-processing machine (processing device) from the post-processing machine via the network 5, and generates accessory preset data on the basis of the acquired device information. Note that the accessory data automatic generation unit is implemented by the accessory preset data automatic generation unit 18.

For example, when the sheet cutter 410 is newly introduced into the printing system 1, the accessory preset data automatic generation unit 18 first acquires device information 510 from the sheet cutter 410 via the network 5 as illustrated in FIG. 33. Then, the accessory preset data automatic generation unit 18 generates accessory preset data on the basis of the acquired device information 510. The accessory preset data generated by the accessory preset data automatic generation unit 18 is stored in the accessory preset data holding unit 10.

According to the present modification, even when post-processing is performed using a post-processing machine newly introduced into the printing system 1, it is possible to appropriately and promptly perform flatplan editing work including accessory design work.

8.3 Third Modification

FIG. 34 is a block diagram showing a functional configuration implemented by the CPU 111 executing the print data generation program P using the memory 112 in the print data generation device 100 in the present modification. As shown in FIG. 34, the print data generation device 100 is provided with a customization unit 19 in addition to the components (cf. FIG. 8) in the above embodiment. The customization unit 19 corrects the accessory image included in the accessory preset data held in the accessory preset data holding unit 10 on the basis of an operation by the operator. As above, in the present modification, it is possible to edit the accessory image constituting the accessory preset data held in the accessory preset data holding unit 10. Note that the accessory data correction unit is implemented by the customization unit 19.

Figure 35:
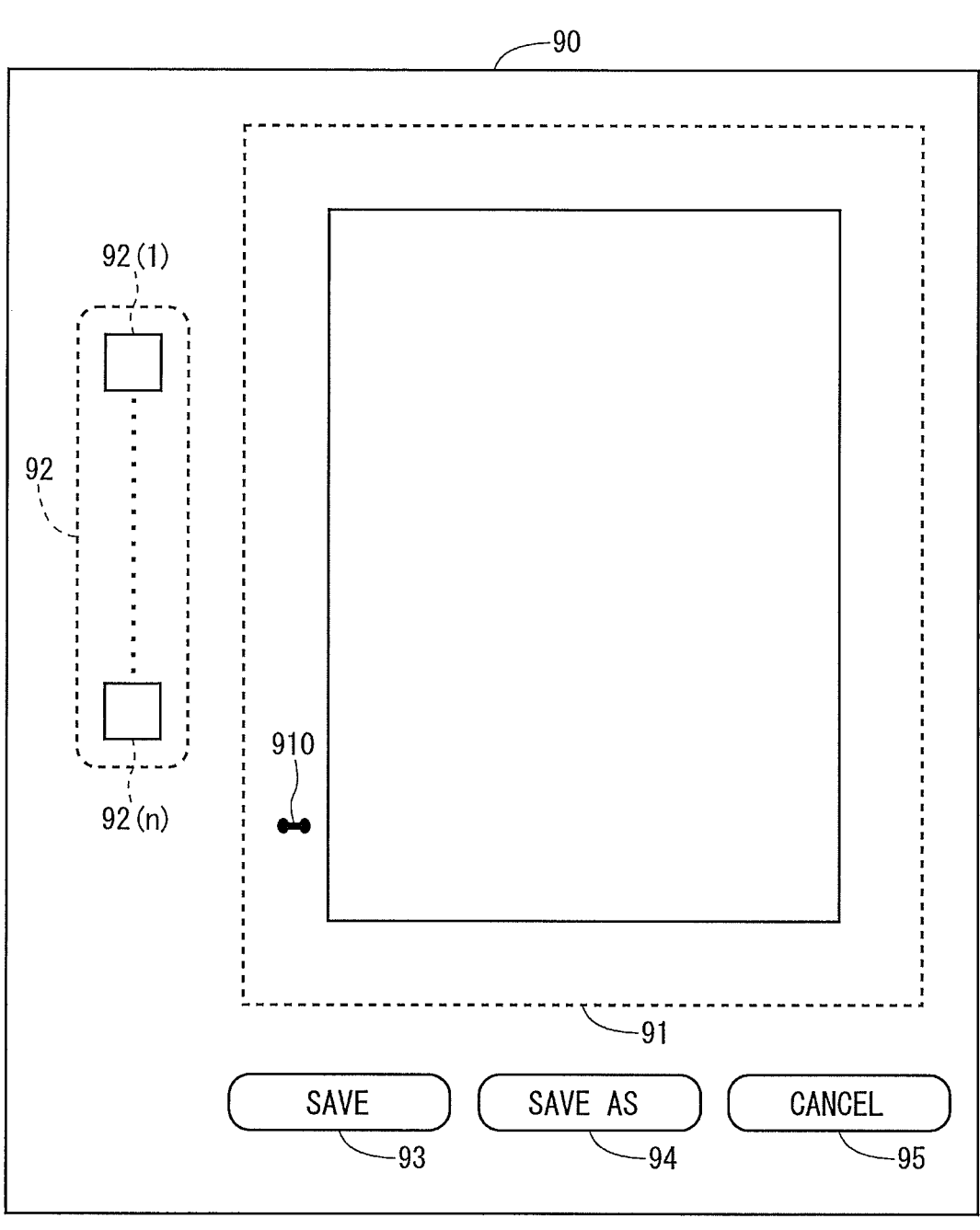
FIG. 35 is a diagram showing an example of a customization screen in the third modification.

In the present modification, when a predetermined menu is selected by the operator in the print data generation device 100, the customization unit 19 displays, for example, a customization screen 90 as illustrated in FIG. 35 on the display unit 123. The customization screen 90 includes an edit area 91, an edit icon area 92, a save button 93, a save as button 94, and a cancel button 95. The edit area 91 is an area where the operator can edit the accessory image. In the example illustrated in FIG. 35, one cutter mark 910 is included in the edit area 91 as the accessory image. The edit icon area 92 includes n icons 92(1) to 92(n) to be pressed by the operator at the time of executing various operations. The save button 93 is a button to be pressed by the operator at the time of overwriting and saving the accessory preset data after the editing of the accessory image. The save as button 94 is a button pressed by the operator at the time of saving the accessory preset data after the editing of the accessory image with a name (preset name) different from the name of the accessory preset data before editing. The cancel button 95 is a button to be pressed by the operator at the time of canceling all the editing work performed on the accessory image.

The operator can read the accessory preset data held in the accessory preset data holding unit 10 and edit the accessory image included in the accessory preset data on the customization screen 90.

According to the present modification, for example, the editing of the accessory image included in the accessory preset data held in the accessory preset data holding unit 10 eliminates the need for correction work by the correction unit 15 on the accessory-included imposition data 31 generated by the accessory-included imposition data generation unit 14.

Further, when a new post-processing machine is introduced into the printing system 1, accessory preset data corresponding to the new post-processing machine can be created on the basis of the accessory preset data corresponding to the existing post-processing machine.

Figure 36:
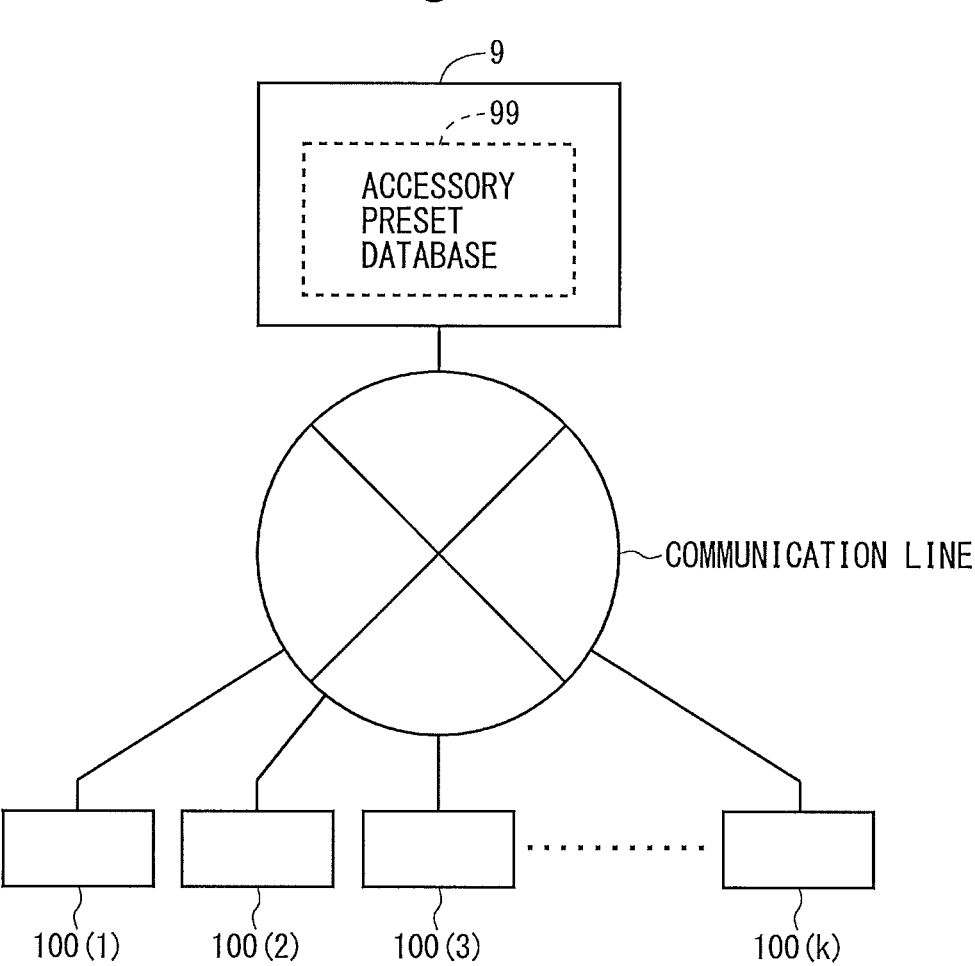
FIG. 36 is a diagram for describing the use of accessory preset data in the form of a cloud in the third modification.

Moreover, the printing system can be efficiently operated by holding the accessory preset data in a database or the like that can be referred to from a plurality of bases. This will be described with reference to FIG. 36. It is assumed that k print data generation devices 100(1) to 100(k) existing in k bases are each connected to a communication line such as the Internet (where k is an integer of 2 or more). Here, a cloud server 9 connected to the communication line is prepared, and an accessory preset database 99 that stores a large number of pieces of accessory preset data is provided in the cloud server 9. The accessory preset database 99 also stores accessory preset data created by the customization unit 19 on the basis of certain accessory preset data. With the configuration as above, it is possible to share one piece of accessory preset data among a plurality of bases, and it is possible to easily manage the accessory preset data even when the specifications of the post-processing machine are different depending on the base. As above, the printing system can be efficiently operated by using the accessory preset data in the form of a cloud.

9. Supplement

In the above embodiment, the CPU 111 as a processor executes the print data generation program P, thereby implementing various functions of the print data generation device 100. However, the configuration is not limited to the configuration using only one CPU 111 as illustrated in FIG. 4. A configuration using a plurality of processors such as a configuration using a plurality of CPUs can also be adopted. As the processor, in addition to the CPU, a micro processing unit (MPU), a graphics processing unit (GPU), a digital signal processor (DSP), or the like can also be adopted. In addition, a plurality of types of processors can be used in combination. For example, with respect to the components shown in FIG. 8, some of the components and the remaining components may be implemented by different processors. Moreover, a configuration including a field-programmable gate array (FPGA) or an application-specific integrated circuit (ASIC) can also be adopted. For example, the rasterization process by the rasterization processing unit 17 can be performed by the ASIC.

10. Others

The present invention is not limited to the above embodiment (including the modifications), and various modifications can be made without departing from the gist of the present invention. For example, although the rasterized print data 34 is transmitted from the print data generation device 100 to the inkjet printing apparatus 200 in the above embodiment, the configuration may be such that the print data 33 before the rasterization process is transmitted from the print data generation device 100 to the inkjet printing apparatus 200 and the print control device 29 in the inkjet printing apparatus 200 performs the rasterization process.

This application is an application claiming priority based on Japanese Patent Application No. 2023-111237entitled "Print Data Generation Device, Print Data Generation Method, and Print Data Generation Program" filed on Jul. 6, 2023, and the contents of which are herein incorporated by reference.

What is claimed is:

1. A print data generation device that generates print data for a printing apparatus to perform printing on printing paper, the print data generation device comprising:
   an accessory data holding unit configured to hold accessory data in which accessory configuration information is associated with an accessory identifier for identifying the accessory configuration information and a processing type indicating a mode of a series of processing processes to be performed after a printing process by the printing apparatus, the accessory configuration information being information necessary for printing an accessory image to be placed outside a print area of an actual image based on submitted data on printing paper;
   a processing type selection unit configured to present a plurality of processing types and accept selection of a processing type by an operator;
   an imposition designation unit configured to accept designation of an imposition mode by the operator, the imposition mode representing arrangement of one or more pages on printing paper;
   an accessory selection unit including an accessory list display unit configured to present selectable accessory identifiers, the accessory selection unit being configured to present, on the accessory list display unit, one or more accessory identifiers identifying one or more pieces of accessory configuration information associated with the processing type accepted by the processing type selection unit with reference to the accessory data held in the accessory data holding unit, and accept selection of an accessory identifier by the operator;
   an accessory-included imposition data generation unit configured to generate accessory-included imposition data by adding an accessory image based on accessory configuration information identified by the accessory identifier accepted by the accessory selection unit to imposition data indicating the imposition mode accepted by the imposition designation unit; and
   an overall imposition processing unit configured to generate the print data by imposing all pages included in the submitted data on a basis of the accessory-included imposition data.

2. The print data generation device according to claim 1, wherein
   the accessory data includes information on a model of a processing device that performs a processing, and
   the accessory selection unit includes a filtering unit configured to present, on the accessory list display unit, only an accessory identifier identifying accessory configuration information associated with a model designated by the operator.

3. The print data generation device according to claim 1, wherein
   the accessory data includes information on manufacturer of a processing device that performs a processing, and
   the accessory selection unit includes a filtering unit configured to present, on the accessory list display unit, only an accessory identifier identifying accessory configuration information associated with a manufacturer designated by the operator.

4. The print data generation device according to claim 1, wherein
   the accessory data includes information on a manufacturer of a processing device that performs a processing and information on a model of the processing device, and
   the accessory selection unit includes a filtering unit configured to present, on the accessory list display unit, only an accessory identifier identifying accessory configuration information associated with both a manufacturer and a model designated by the operator.

5. The print data generation device according to claim 1, wherein
   the accessory data includes comment data, and
   the accessory selection unit includes a filtering unit configured to present, on the accessory list display unit, only an accessory identifier identifying accessory configuration information associated with comment data including a text string designated by the operator.

6. The print data generation device according to claim 1, wherein
   the accessory data includes information on a model of a processing device that performs a processing, and
   the accessory list display unit also presents information on a model associated with each of the selectable accessory identifiers.

7. The print data generation device according to claim 1, wherein when the processing type selection unit accepts selection of a processing type by the operator, the imposition designation unit displays a screen for the operator to designate an imposition mode depending on the processing type accepted by the processing type selection unit.

8. The print data generation device according to claim 1, further comprising an accessory-included imposition data correction unit configured to allow the operator to correct an accessory image included in the accessory-included imposition data.

9. The print data generation device according to claim 8, wherein when the accessory selection unit accepts selection of a plurality of accessory identifiers, the accessory-included imposition data generation unit determines whether a plurality of accessory images based on a plurality of pieces of accessory configuration information identified by the plurality of accessory identifiers overlap each other.

10. The print data generation device according to claim 1, further comprising an accessory data automatic generation unit configured to acquire, from a processing device, device information in a predetermined format representing a specification of the processing device via a network and generate the accessory data on a basis of the device information.

11. The print data generation device according to claim 1, further comprising a rasterization processing unit that performs a rasterization process on the print data generated by the overall imposition processing unit.

12. The print data generation device according to claim 1, further comprising an accessory data correction unit configured to allow the operator to correct an accessory image included in the accessory data held in the accessory data holding unit.

13. A print data generation device that generates print data for a printing apparatus to perform printing on printing paper, the print data generation device comprising:

a display device;

a storage device configured to hold accessory data in which accessory configuration information is associated with an accessory identifier for identifying the accessory configuration information and a processing type indicating a mode of a series of processing processes to be performed after a printing process by the printing apparatus, the accessory configuration information being information necessary for printing an accessory image to be placed outside a print area of an actual image based on submitted data on printing paper; and a processor;

wherein the processor presents a plurality of processing types on the display device and accepts selection of a processing type by an operator;

the processor accepts designation of an imposition mode by the operator, the imposition mode representing arrangement of one or more pages on printing paper;

the processor presents, on the display device, one or more accessory identifiers that identify one or more pieces of accessory configuration information associated with the processing type accepted with reference to the accessory data held in the storage device, and accepts selection of an accessory identifier by the operator, the processor generates accessory-included imposition data by adding an accessory image based on accessory configuration information identified by the accessory identifier accepted to imposition data indicating the imposition mode accepted, and the processor generates the print data by imposing all pages included in the submitted data on a basis of the accessory-included imposition data.

14. A print data generation method for generating, by a print data generation device, print data for a printing apparatus to perform printing on printing paper, the print data generation device including a display unit, and an accessory data holding unit configured to hold accessory data in which accessory configuration information is associated with an accessory identifier for identifying the accessory configuration information and a processing type indicating a mode of a series of processing processes to be performed after a printing process by the printing apparatus, the accessory configuration information being information necessary for printing an accessory image to be placed outside a print area of an actual image based on submitted data on printing paper, the print data generation method comprising:

a processing type selection step of presenting a plurality of processing types and accepting selection of a processing type by an operator;

an imposition designation step of accepting designation of an imposition mode by the operator, the imposition mode representing arrangement of one or more pages on printing paper;

an accessory selection step of presenting one or more accessory identifiers identifying one or more pieces of accessory configuration information associated with the processing type accepted in the processing type selecting step on the display unit with reference to the accessory data held in the accessory data holding unit, and accepting selection of an accessory identifier by the operator;

an accessory-included imposition data generation step of generating accessory-included imposition data by adding an accessory image based on accessory configuration information identified by the accessory identifier accepted in the accessory selection step to imposition data indicating the imposition mode accepted in the imposition designation step; and an overall imposition processing step of generating the print data by imposing all pages included in the submitted data on a basis of the accessory-included imposition data.

* * * * *